(12) United States Patent
Inagaki et al.

(10) Patent No.: US 8,034,509 B2
(45) Date of Patent: Oct. 11, 2011

(54) POLYMER ELECTROLYTE MEMBRANE WITH AN INORGANIC BACKBONE

(75) Inventors: Shinji Inagaki, Nagoya (JP); Yoshiaki Fukushima, Aichi-gun (JP); Masaya Kawasumi, Anjyo (JP); Naoki Hasegawa, Kasugai (JP); Yu Morimoto, Nagoya (JP); Kyoko Tsusaka, Nagoya (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 550 days.

(21) Appl. No.: 10/379,812

(22) Filed: Mar. 6, 2003

(65) Prior Publication Data

US 2003/0175569 A1 Sep. 18, 2003

(30) Foreign Application Priority Data

Mar. 7, 2002 (JP) .............................. P2002-062477

(51) Int. Cl.
*H01M 8/10* (2006.01)
*C01B 33/20* (2006.01)
*C08J 5/20* (2006.01)
(52) U.S. Cl. ........ 429/493; 429/492; 429/480; 429/483; 423/326; 521/27; 528/14; 528/34
(58) Field of Classification Search .................. None
See application file for complete search history.

(56) References Cited

U.S. PATENT DOCUMENTS

| | | | |
|---|---|---|---|
| 6,242,135 B1 * | 6/2001 | Mushiake | 429/304 |
| 6,248,686 B1 * | 6/2001 | Inagaki et al. | 502/158 |
| 6,592,934 B2 * | 7/2003 | Totsuka | 427/115 |
| 2002/0001744 A1 * | 1/2002 | Tsusaka et al. | 429/42 |

FOREIGN PATENT DOCUMENTS

| | | |
|---|---|---|
| EP | 0 949 703 | 10/1999 |
| EP | 1 110 992 | 6/2001 |
| EP | 1 202 365 | 5/2002 |
| JP | 10-241701 | 9/1998 |
| JP | 2000-58085 | 2/2000 |
| JP | 2001-011219 | 1/2001 |
| JP | 2001-307545 | 11/2001 |
| JP | 2002-56895 | 2/2002 |
| WO | WO 99/33125 | 7/1999 |
| WO | WO 00/54351 | 9/2000 |
| WO | WO 02/37506 A1 | 5/2002 |

* cited by examiner

*Primary Examiner* — Keith Walker
(74) *Attorney, Agent, or Firm* — Oblon, Spivak, McClelland, Maier & Neustadt, L.L.P.

(57) ABSTRACT

The membrane electrode assembly 1 has an anode 10, a cathode 20, and an electrolyte membrane 30 disposed between the anode and cathode; the anode and cathode are gas diffusion electrodes; the electrolyte membrane contains a solid electrolyte in which a plurality of pores with mean pore diameters of 1 to 30 nm are formed; and the solid electrolyte has a backbone comprising organic groups having one or more metal atoms, oxygen atoms bonded to the metal atoms, and carbon atoms bonded to the metal atoms or oxygen atoms, and also has functional groups with ion-exchange capabilities that are bonded to the organic groups in the pores.

28 Claims, 16 Drawing Sheets

POLYMER ELECTROLYTE MEMBRANE WITH AN INORGANIC BACKBONE

BACKGROUND OF THE INVENTION

1. Field of the Invention

The present invention relates to a membrane electrode assembly, fuel cell, electrolytic cell, and solid electrolyte.

2. Related Background Art

Fuel cells are devices for directly supplying to the outside electric energy generated using electrochemical reactions that comprise oxidation reactions involving a reductant-containing gas (referred to hereinbelow as "fuel gas" or "anode reaction gas") fed to the anode, and reduction reactions involving an oxidizer-containing gas (referred to hereinbelow as "cathode reaction gas") fed to the cathode to make it possible to obtain high power generation efficiency under the operating conditions of a relatively low-temperature region. In addition, fuel cells make it easier to recover thermal energy generated in the course of the aforementioned electric cells. For this reason, power generation systems equipped with fuel cells can achieve higher overall energy efficiency in comparison with heat engines, which are limited by the Carnot efficiency. Furthermore, fuel cells have achieved prominence as clean power generation systems that have minimal impact on the global environment because water is theoretically the only reaction product obtained when hydrogen is used as the reductant, and oxygen as the oxidant.

Such fuel cells are classified by electrode active material, electrolyte, operating temperature, and the like. Among these cells, solid-polymer fuel cells (or polymer-electrolyte fuel cells) featuring ion-exchange membranes composed of polymer electrolytes or the like as certain types of electrolyte have potential for practical use as power supplies in small-size cogeneration systems or in electric cars and other moving vehicles, and are being extensively studied with the aim of achieving performance improvements because these cells can operate at comparatively low temperatures and can easily be fashioned into compact and lightweight devices.

In conventional practice, a common solid-polymer fuel cell has as the constituent elements thereof at least membrane electrode assemblies (MEA) obtained by employing gas diffusion electrodes as the anode and cathode, and interposing and bonding (or contacting) an electrolyte membrane between the anode and cathode. In addition, gas diffusion electrodes used in such membrane electrode assemblies commonly comprise catalyst layers containing catalyst-carrying carbon microparticles coated with an electrolyte (ion-exchange resin or the like), and gas diffusion layers for feeding reaction gas to the catalyst layers and collecting the electric charge generated in the catalyst layers. Voids composed of micropores formed between the secondary particles and/or tertiary particles of carbon or another porous microparticulate material are present in the catalyst layers of the gas diffusion electrodes, and these voids function as diffusion channels for the reaction gas.

In a conventional membrane electrode assembly, the ionic conductance of the electrolyte membrane and of the electrolyte coating on the aforementioned catalyst decreases when the membrane and the electrolyte become dry and their moisture content is reduced, with the result that the cell voltage decreases and the power generation efficiency of the cell decreases as well. Consequently, the polymer electrolyte membrane and the electrolyte coating on the catalyst in an operating electric cell must be prevented from drying in order to maintain a high level of operation without lowering the power generation efficiency of the fuel cell.

For this reason, conventionally known methods include those in which, for example, anode reaction gas and/or cathode reaction gas is humidified in advance at a temperature that is equal or nearly equal to the cell temperature, and the value of the water vapor partial pressure in at least one of the anode reaction gas and/or cathode reaction gas is adjusted to reach substantial agreement with the value of saturated water vapor pressure at the operating temperature of the membrane electrode assembly before the gas is fed to the electric cell; and those in which water for humidification is directly fed to the electric cell, and the water is vaporized in the electric cell to achieve humidification or the like.

In addition, currently researched solid-electrolyte fuel cells generally have low operating temperatures and do not lend themselves easily to the utilization of waste heat because of limitations imposed by the heat resistance, ionic conductance, and other properties of polymer electrolyte membranes, requiring that a performance capable of ensuring high power generation efficiency and high output density under the operating conditions of high anode reaction gas (pure hydrogen or the like) utilization efficiency and cathode reaction gas (air or the like) utilization efficiency be established in order to allow such cells to be used in actual practice.

However, the quantity of water transported together with the protons that travel through the polymer electrolyte membrane from the anode to the cathode increases, as does the quantity of condensed water produced by the electrode reactions on the cathode, under operating conditions characterized by the comparatively high reaction velocity of such cell reactions. This tends to produce a so-called flooding phenomenon, which is a phenomenon in which water fails to rapidly drain to the outside and plugs the voids in the catalyst layer of the cathode. When the flooding phenomenon occurs, the cathode reaction gas is prevented from being fed to the reaction site on the catalyst layer, and it becomes impossible to obtain the desired cell output in a stable manner.

For this reason, a solid-polymer fuel cell in which flooding can be prevented and the desired cell output obtained in a stable manner by adding polytetrafluoroethylene (referred to hereinbelow as "PTFE"), tetrafluoroethylene/hexafluoropropylene polymer, tetrafluoroethylene/perfluoro(alkyl vinyl ether) copolymer, or another such fluororesin as a hydrophobization agent to the cathode catalyst layer to endow the cathode with adequate water drainage is proposed, for example, in Japanese Patent Application Laid-open No. H5-36418. As used in the present specification, the term "A/B copolymer" refers to a copolymer comprising polymerization units based on A and polymerization units based on B.

SUMMARY OF THE INVENTION

The above-described conventional fuel cell has the following drawbacks, however. Specifically, feeding anode reaction gas and cathode reaction gas to the electric cell after humidifying these gases in advance at a temperature equal or nearly equal to the temperature of the electric cell in this manner creates a need for a large quantity of purified water for humidification purposes and makes it necessary to install a storage tank for providing water for humidification purposes, a humidifier for humidifying the reaction gas with the water for humidification, a condenser for recovering water discharged from the fuel cell, a controller to operate these elements, and other types of peripheral equipment, bringing about problems in the sense of increasing the scale of the power generation system and producing a more complicated structure. It is also difficult in this case to obtain adequate power generation efficiency from the power generation system as a whole.

Furthermore, using bulky peripheral equipment in order to deal with the above-described humidification conditions increases the tendency whereby it becomes more difficult to rapidly change the temperature of humidifiers, condensers, and other types of heat-exchange equipment, and also increases the tendency whereby it becomes more difficult to rapidly vary the partial pressure of water vapor in the reaction gas. For this reason, it is sometimes difficult to rapidly adjust the supply of water vapor components for humidification in a commensurate manner to match the rapid variations in the operating state of a fuel cell. As a result, problems sometimes occur whereby the moisture necessary for humidification is fed in insufficient quantities to the polymer electrolyte membrane, bringing about a reduction in cell output, or problems occur whereby excess moisture is fed to the electrodes, bringing about flooding.

Humidification equipment is also needed and the same problems as above occur if water for humidification is fed directly to the electric cell and is vaporized in the cell to achieve humidification. In the particular case of an electric cell operating at a low temperature, water is retained by the electrodes, the flooding problem occurs, and the problem whereby the cell voltage decreases sharply is encountered if the water cannot be adequately vaporized in the cell.

The fuel cell described in Japanese Patent Application Laid-open No. H5-36418 above, while allowing highly water-repellent voids to be formed by including a water repellent into the catalyst layer, is still disadvantageous in the sense that cell output is reduced rather than increased by the increase in the electric resistance of the electrodes due to the insulation properties of the water repellent, or by the reduction in gas diffusion in the catalyst layer due to the increased thickness of the catalyst layer. Another drawback is that the power generation system sometimes increases in scale and acquires a complex structure.

There are also cases in which, for example, attempts are made to operate electric cells in a state in which the partial pressure of the water vapor contained in the reaction gas fed to the electrodes is kept below the pressure of saturated water vapor at the operating temperature of the electric cells; that is, in so-called low-humidity conditions, or cases in which attempts are made to operate electric cells in so-called unhumidified conditions, in which the reaction gas fed to the electrode is not humidified at all; for example, the moisture content of an operating cell is controlled using the product water of the cell reactions in order to reduce the overall energy loss of the power generation system that accompanies the aforementioned humidification, and to make the system more compact.

Operating an electric cell under such humidification conditions is disadvantageous, however, in that it is impossible to completely prevent the drying of the ion-exchange resin contained in the polymer electrolyte membrane or electrodes, the cell voltage decreases contrary to design, and the power generation efficiency decreases as well during operation.

Specifically, practical implementation has yet to be achieved concerning a membrane electrode assembly that is configured to allow the product water in the cathode to be efficiently used to humidify the electrolyte membrane or the electrolyte in the catalyst layer, and that is capable of adequately operating under such low-humidification conditions on unhumidified conditions, and also concerning a fuel cell that comprises this assembly.

Another drawback is that it is impossible to ensure adequate electrolysis efficiency when the above-described conventionally configured membrane electrode assembly is used in an electrolytic cell.

An object of the present invention, which was perfected in view of the above-described drawbacks of the conventional art, is to provide a membrane electrode assembly in which the product water of cell reactions can be efficiently used to humidify the electrolyte membrane and in which high output can be obtained in a stable manner even when the quantity of water fed to the electrolyte membrane from the outside is reduced or blocked off altogether; to provide a fuel cell that lends itself to size reduction and can deliver high power generation efficiency; and to provide an electrolytic cell that lends itself to size reduction and can deliver high power generation efficiency.

Another object of the present invention is to provide a solid electrolyte that can be appropriately used as a material for the electrolyte membrane of the membrane electrode assembly, fuel cell, and electrolytic cell of the present invention.

As a result of extensive research aimed at attaining the stated object, the inventors perfected the present invention upon discovering that the reduction in output can be adequately controlled when the water fed to the electrolyte membrane from the outside is reduced or blocked off altogether during operation by employing an organic/inorganic composite material that combines the structure of an inorganic material and the structure of an organic material, and has pores whose mean pore diameters fall within a specific range; forming an electrolyte membrane that contains as a constituent material thereof a solid electrolyte in which functional groups having ion-exchange capabilities are bonded to the organic groups constituting the backbone of the composite material; and forming a membrane electrode assembly using this membrane.

Specifically, the present invention provides a membrane electrode assembly comprising an anode, a cathode, and an electrolyte membrane disposed between the anode and cathode, wherein the electrolyte membrane comprising a solid electrolyte in which a plurality of pores with mean pore diameters of 1 to 30 nm are formed, and the solid electrolyte has a backbone comprising organic groups having one or more metal atoms, oxygen atoms bonded to the metal atoms, and carbon atoms bonded to the metal atoms or oxygen atoms, and also has functional groups with ion-exchange capabilities that are bonded to the organic groups in the pores.

As used herein in reference to the present invention, the term "membrane electrode assembly" indicates a product in which an electrolyte membrane and electrodes are mutually bonded and integrated by a heat treatment or the like (for example, hot pressing), or a product in which the electrolyte membrane and the electrode are brought into contact with each other while allowed to remain separate. In addition, the term "gas diffusion electrode" used in the present specification refers to an electrode having at least a catalyst layer that contains a catalyst and has gas diffusion properties and electrical conductivity.

The above-described solid electrolyte pertaining to the present invention and having the above-described backbone structure and pores that satisfy the above-described conditions for the mean pore diameter, and also having functional groups that have ion-exchange capabilities and are bonded to the organic groups in these pores, can adequately maintain water in a liquid state inside the pores by the capillary condensation phenomenon even when the partial pressure p of the water vapor in the pores at an ambient temperature that allows for the presence of the solid electrolyte is less than the pressure $p_0$ of saturated water vapor at the ambient temperature (that is, the absolute pressure of water vapor $p/p_0$, expressed as the ratio $p/p_0$ of p and $p_0$, is less than 1.0). The ions in water can be adequately conducted, in accordance with an ionic conduction mechanism that is identical to the one involving a polymer electrolyte, by functional groups with ion-exchange capabilities inside the pores completely filled with water in this manner.

For this reason, an electrolyte membrane containing this solid electrolyte as a constituent material can also maintain high ionic conductance even when the partial pressure p of the water vapor in the pores at an ambient temperature that allows for the presence of the electrolyte membrane is less than the pressure $p_0$ of saturated water vapor at the ambient temperature.

Consequently, the membrane electrode assembly of the present invention, in which this electrolyte membrane is mounted, allows the electrolyte membrane to retain the product water of the cathode in the pores thereof by the capillary condensation phenomenon and to successfully prevent the ionic conductance from decreasing even when the quantity of water fed to the electrolyte membrane from the outside is reduced or blocked off altogether, making it possible to obtain high output in a stable manner. Specifically, the membrane electrode assembly of the present invention allows the product water of the cathode to be used for humidification with high efficiency, and high output to be obtained in a stable manner even when the partial pressure of water vapor in at least either the reaction gas fed to the anode or the reaction gas fed to the cathode is less than the saturated water vapor pressure at the operating temperature of the membrane electrode assembly.

For this reason, it is possible in the membrane electrode assembly of the present invention to markedly reduce the heretofore described quantity of water used for humidification and introduced from the outside in order to humidify the electrolyte membrane or the electrolyte in the catalyst layer during operation, and also to dispense with the water for humidification completely. Consequently, the membrane electrode assembly allows the peripheral equipment for humidification to be markedly reduced in size, and the structure of the entire power generation system to be readily simplified and made more compact.

In addition, a solid electrolyte having the above-described backbone structure has high mechanical strength and heat resistance, so the electrolyte membrane for the membrane electrode assembly of the present invention has higher mechanical strength and heat resistance than does a conventional polymer electrolyte membrane. For this reason, the membrane electrode assembly of the present invention can operate across a wider temperature range than can a membrane electrode assembly in which a polymer electrolyte membrane is mounted. For example, the membrane electrode assembly of the present invention can operate across a temperature range of −40 to 500° C.

Obtaining hydrogen by subjecting methanol, methane, or other hydrocarbon-based starting materials to reforming reactions has been studied in connection with membrane electrode assemblies in which conventional polymer electrolyte membranes are mounted when hydrogen is used as the reaction gas for the anode, and incorporating the reforming equipment used for this purpose into a power generation system has also been studied, but because the reaction temperature of these reforming reactions is higher than the operating temperature of the membrane electrode assembly, the hydrogen and water-vapor-containing gas produced by such reforming reactions must be cooled down to the operating temperature of the membrane electrode assembly before being fed, and the condensers and other peripheral equipment used for this purpose increase in size.

By contrast, the membrane electrode assembly of the present invention can operate at a higher temperature than in the past, and can therefore be greatly reduced in size in cases in which the aforementioned condensers and other peripheral equipment are usually installed. From this perspective as well, the membrane electrode assembly of the present invention can facilitate making the structure of the entire power generation system simpler and smaller in size. In addition, the membrane electrode assembly of the present invention can operate at a higher temperature than in the past, and can therefore also be valuable when used as the membrane electrode assembly of a so-called direct methanol fuel cell (DMFC), in which methanol is directly fed instead of hydrogen to the anode.

Furthermore, the product water of the cathode is successfully retained in the pores of the solid electrolyte in the electrolyte membrane in the case of the membrane electrode assembly of the present invention, making it possible to simplify the electrode structure because there is no need, for example, to separately provide a water-repellent layer in order to prevent the product water of the cathode from being discharged outside.

When the humidification conditions for the reaction gas fed to the electrodes are set such that the partial pressure of the water vapor contained in the reaction gas is kept at the same level as the saturated water vapor pressure at the operating temperature of the electric cell, there is an increased tendency for electrolyte resistance to rise in the area of the polymer electrolyte membrane that faces the anode when the humidification from the anode side during operation becomes insufficient because of the movement of water that travels together with protons through the polymer electrolyte membrane from the anode toward the cathode in a membrane electrode assembly in which a conventional polymer electrolyte membrane is mounted, and there is a stronger tendency for the voids in the catalyst layer of the cathode to be flooded by the water moving from the anode and by the condensed product water generated by the electrode reactions on the cathode.

However, the membrane electrode assembly of the present invention can ensure a more stable output in comparison with a membrane electrode assembly in which a conventional polymer electrolyte membrane is mounted because any uneven distribution of water in the operating electrolyte membrane such as the one described above can be successfully prevented by the heretofore described capillary condensation phenomenon in the pores even when the operation is conducted under the same humidification conditions as in the prior art.

In the membrane electrode assembly of the present invention described herein, the anode and cathode are preferably gas diffusion electrodes. An appropriate membrane electrode assembly can thereby be constructed more securely when used in a fuel cell.

The present invention also provides a fuel cell comprising at least the above-described membrane electrode assembly of the present invention; a cathode separator that is disposed in a state proximate to the external surface of the cathode in the membrane electrode assembly, and that at least comprises a groove for forming a channel for feeding an oxidizer-containing cathode reaction gas to the cathode from outside the membrane electrode assembly; and an anode separator that is disposed in a state proximate to the external surface of the anode in the membrane electrode assembly, and that at least comprises a groove for forming a channel for feeding a reductant-containing cathode reaction gas to the anode from outside the membrane electrode assembly.

The fuel cell of the present invention can make it easier to reduce the size of a power generation system containing this cell, and can yield higher power generation efficiency by being provided with the above-described membrane electrode assembly of the present invention.

The present invention further provides an electrolytic cell comprising at least the above-described membrane electrode assembly of the present invention, and a voltage application element for applying a specific voltage between the anode and cathode that comprise the membrane electrode assembly. The electrolytic cell of the present invention can make it easier to reduce the size of a power generation system containing this cell, and can yield higher power generation efficiency by being provided with the above-described membrane electrode assembly of the present invention.

Moreover, the present invention provides a solid electrolyte in which a plurality of pores with mean pore diameters of 1 to 30 nm are formed; which has a backbone comprising organic groups having one or more metal atoms, oxygen atoms bonded to the metal atoms, and carbon atoms bonded to the metal atoms or oxygen atoms, and also has functional groups with ion-exchange capabilities that are bonded to the organic groups in the pores; and which further has one or more peaks at a diffraction angle that corresponds to a d-value of 1.5 nm or less in an X-ray diffraction pattern.

The above-described solid electrolyte pertaining to the present invention and having the above-described backbone structure and pores that satisfy the above-described conditions for the mean pore diameter, and also having functional groups that have ion-exchange capabilities and are bonded to the organic groups in these pores, can adequately maintain water in a liquid state inside the pores by the capillary condensation phenomenon even when the partial pressure p of the water vapor in the pores at an ambient temperature that allows for the presence of the solid electrolyte is less than the pressure $p_0$ of saturated water vapor at the ambient temperature (that is, the absolute pressure of water vapor $p/p_0$ is less than 1.0). The ions in water can be adequately conducted, in accordance with an ionic conduction mechanism that is identical to the one involving a polymer electrolyte, by functional groups with ion-exchange capabilities inside the pores completely filled with water in this manner.

Furthermore, the above-described solid electrolyte of the present invention has one or more peaks at a diffraction angle that corresponds to a d-value of 1.5 nm or less in an X-ray diffraction pattern. This indicates that an ordered periodic structure on the molecular scale is created in the pore walls of the pores of this solid electrolyte. For this reason, the functional groups with ion-exchange capabilities in the pores can also be readily arranged in an ordered fashion on the wall surfaces of the pores in this solid electrolyte. The distribution state of the functional groups with ion-exchange capabilities on the wall surfaces of the pores in this solid electrolyte can thereby be readily kept in a state extremely close to an ideal state in which the functional groups with ion-exchange capabilities are distributed in a uniform manner. As a result, the water content in the pores of this solid electrolyte can be kept uniform without any type of uneven distribution.

For this reason, an electrolyte membrane containing this solid electrolyte as a constituent material can maintain high ionic conductance even when the partial pressure p of the water vapor in the pores at an ambient temperature that allows for the presence of the electrolyte membrane is less than the pressure $p_0$ of saturated water vapor at the ambient temperature. Consequently, the above-described solid electrolyte of the present invention can be appropriately used as a material for the electrolyte membrane of the previously described membrane electrode assembly, fuel cell, and electrolytic cell of the present invention.

DESCRIPTION OF THE PREFERRED EMBODIMENTS

Preferred embodiments of the present invention will now be described in detail with reference to the drawings. In the description that follows, identical symbols are used for identical or corresponding portions, and overlapping descriptions are omitted.

[First Embodiment]

Figure 1:
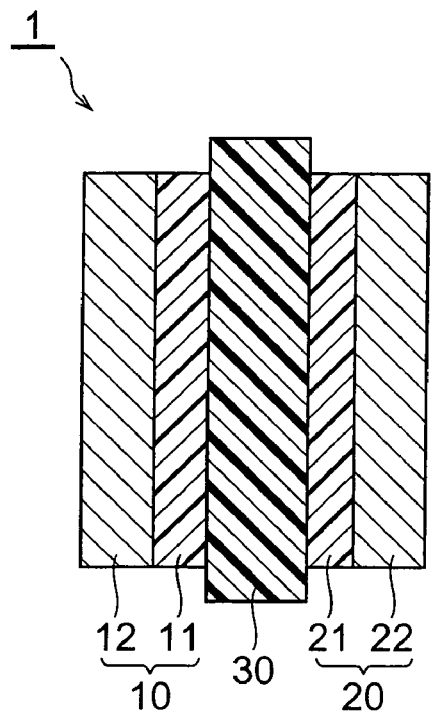
FIG. 1 is a schematic cross-sectional view depicting a first embodiment of the membrane electrode assembly of the present invention.
Figure 2:
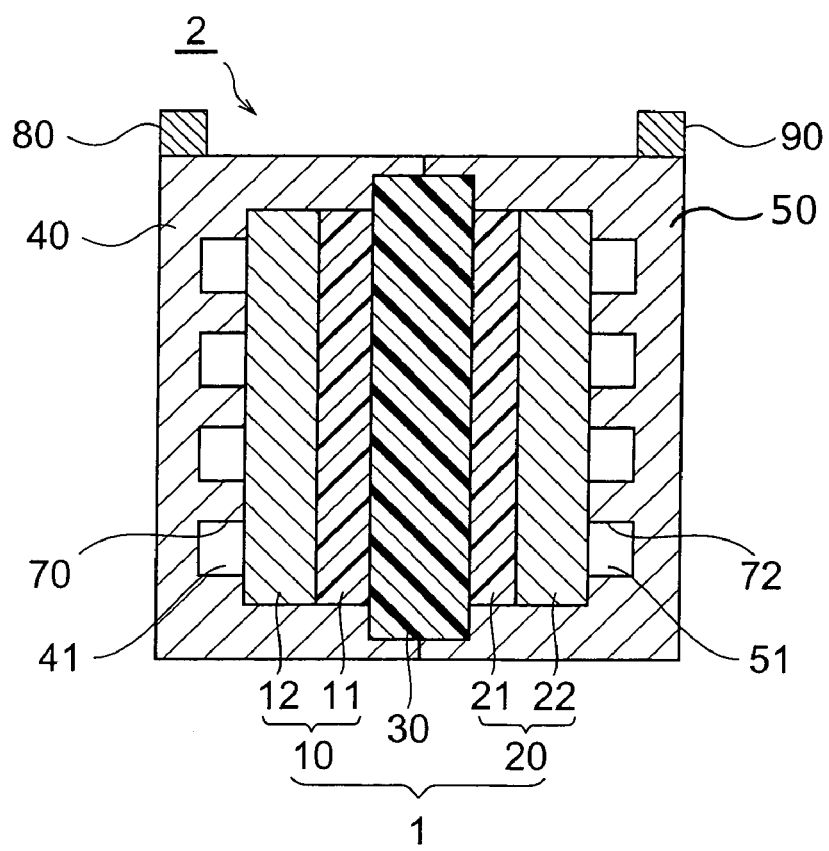
FIG. 2 is a schematic cross-sectional view depicting a preferred embodiment of a fuel cell comprising the membrane electrode assembly shown in FIG. 1.

FIG. 1 is a schematic cross-sectional view depicting a first embodiment of the membrane electrode assembly of the present invention. In addition, FIG. 2 is a schematic cross-sectional view depicting a preferred embodiment of a fuel cell comprising the membrane electrode assembly shown in FIG. 1. The fuel cell 2 shown in FIG. 2 is a fuel cell suitable for use as the power supply of a moving vehicle or a compact cogeneration system. The fuel cell 2 generates electric energy by electrochemical reactions using anode reaction gas and cathode reaction gas.

The fuel cell 2 shown in FIG. 2 primarily comprises a flat membrane electrode assembly 1, an anode separator 40 and a cathode separator 50 disposed on both sides of the membrane electrode assembly 1, an external output terminal 80 electrically connected to the outside surface of the anode separator 40, and an external output terminal 90 electrically connected to the outside surface of the cathode separator 50.

Furthermore, the membrane electrode assembly 1 primarily comprises an anode 10 as a gas diffusion electrode, a cathode 20 as a gas diffusion electrode, and a proton-conducting electrolyte membrane 30 disposed between the anode 10 and cathode 20, as shown in FIGS. 1 and 2.

In the fuel cell 2, a hydrogen-containing gas (fuel gas) produced by the water vapor reforming of a hydrocarbon-based raw fuel such as, for example, methanol or natural gas is used as the anode gas, and an oxygen-containing gas such as, for example, air is used as the cathode gas. In this case, the electrode reactions given by Eqs. (I) and (II) below proceed at the anode 10 and cathode 20, respectively; and the combined cell reaction given by Eq. (III) proceeds overall.

$$H_2 \rightarrow 2H^+ + 2e^- \tag{I}$$

$$(\tfrac{1}{2})O_2 + 2H^+ + 2e^- \rightarrow H_2O \tag{II}$$

$$H_2 + (\tfrac{1}{2})O_2 \rightarrow H_2O \tag{III}$$

Each constituent element of the present embodiment will now be described in detail based on FIGS. 1 and 2. The electrolyte membrane 30 will first be described. The electrolyte membrane may be a membrane formed solely from the solid electrolyte described above, or it may, in addition to the solid electrolyte, further contain an electrolyte different from the solid electrolyte. A proton-conducting polymer electrolyte is preferred as the electrolyte different from the solid electrolyte.

The solid electrolyte contained in the electrolyte membrane 30 will first be described. The solid electrolyte used in the present invention has a backbone that has pores with a mean pore diameter of 1 to 30 nm and that comprises organic groups with one or more metal atoms, oxygen atoms bonded to the metal atoms, and carbon atoms bonded to the metal atoms or oxygen atoms; and also has functional groups with ion-exchange capabilities that are bonded to the organic groups in the pores.

In the solid electrolyte pertaining to the present invention, the mean pore diameter of the pores is 1 to 30 nm, preferably 1 to 10 nm, and even more preferably 1 to 5 nm, as described above. When the mean pore diameter of the pores is greater than 30 nm, the capillary condensation phenomenon is less likely to develop, and it becomes impossible to completely fill the pores with the liquid electrolyte if the above-described relative pressure $p/p_0$ of water vapor is less than 1.0. In addition, the capillary condensation phenomenon is usually more likely to develop with a reduction in the mean pore diameter of pores, but when the mean pore diameter is less than 1 nm, water is not a liquid any longer, a near-solid state is achieved, and it becomes more difficult to ensure adequate ionic conductance.

The relation between the pore diameter (D) and the relative pressure ($p/p_0$) that gives rise to the capillary phenomenon can be expressed as the equation (Kelvin equation) shown below. In the equation shown hereinbelow, γ designates the surface tension of the aggregated liquid (that is, water), $V_L$ the molar volume of a mole of the aggregated liquid, θ the contact angle between a pore wall and the aggregated liquid, R the gas constant, and T the absolute temperature. It can be seen from the above equation that the relative pressure at which the capillary phenomenon occurs decreases with a reduction in the pore diameter.

$$\ln(p/p_0) = -(2\gamma V_L \cos\theta)/\{(D/2)RT\}$$

As used in reference to the present invention, the term "mean pore diameter" refers to the pore diameter at the maximum peak of a curve (pore diameter distribution curve) in which a value (dV/dD) obtained by differentiating the pore volume (V) with respect to the pore diameter (D) is plotted against the pore diameter (D).

The pore diameter distribution curve can be determined by the method described below. Specifically, the solid electrolyte is cooled to the temperature of liquid nitrogen (−196° C.), nitrogen gas is introduced, the absorption quantity thereof is determined by the constant volume method or gravimetric method, the pressure of the introduced nitrogen gas is gradually increased, the absorbed quantity of the nitrogen gas is plotted against each equilibrium pressure, and absorption isotherms are obtained. Using these adsorption isotherms, it is possible to determine the pore diameter distribution curve by the Cranston-Inkley method, Dollimore-Heal method, BJH method, or other calculation method.

In the solid electrolyte pertaining to the present invention, no less than 60% of the entire pore volume is preferably contained within a ratio of ±40% in terms of the mean pore diameter on the pore diameter distribution curve. As used herein, the phrase "no less than 60% of the entire pore volume is contained within a ratio of ±40% in terms of the pore diameter that indicates the maximum peak on the pore diameter distribution curve" refers to a situation such that when, for example, the mean pore diameter is 3.00 nm, the combined volume of the pores that are within ±40% of the 3.00 nm; that is, within a range of 1.80 to 4.20 nm, constitutes no less than 60% of the entire pore volume. This means that an organic/inorganic composite material that satisfies this condition has highly uniform pore diameters.

In addition, no particular restrictions are imposed on the specific surface area of the solid electrolyte pertaining to the present invention, although 700 m²/g or greater is preferred.

The specific surface area can be calculated as a BET specific surface area from adsorption isotherms by the use of the BET isotherm adsorption equation.

In addition, the solid electrolyte pertaining to the present invention preferably has one or more peaks at a diffraction angle that corresponds to a d-value of 1 nm or greater on the X-ray diffraction pattern thereof. The presence of an X-ray diffraction peak means that a periodic structure whose d-value corresponds to this peak angle is in the sample. For this reason, the presence of one or more peaks at a diffraction angle that corresponds to a d-value of 1 nm or greater means that the pores are distributed in a regular manner at an interval of 1 nm or greater.

The pores possessed by the solid electrolyte pertaining to the present invention are formed not only on the particle surfaces but also in the interior. The pores are not limited in any particular way in terms of shape and may, for example, go all the way through in the form of tunnels, or have a configuration in which spherical or polygonal cavities are linked together.

In addition, the solid electrolyte preferably has one or more peaks at a diffraction angle that corresponds to a d-value of 1.5 nm or less in an X-ray diffraction pattern. In a solid electrolyte that satisfies this condition, an ordered periodic structure on the molecular scale is created in the pore walls of each pore. For this reason, the functional groups with ion-exchange capabilities in the pores can also be readily arranged in an ordered fashion on the wall surfaces of the pores in this solid electrolyte. The distribution state of the functional groups with ion-exchange capabilities on the wall surfaces of the pores in this solid electrolyte can thereby be readily kept in a state extremely close to an ideal state in which the functional groups with ion-exchange capabilities are distributed in a uniform manner. As a result, the water content in the pores of this solid electrolyte can be kept uniform even more securely without any type of uneven distribution.

The solid electrolyte pertaining to the present invention has a backbone that comprises organic groups having one or more metal atoms, oxygen atoms bonded to the metal atoms, and carbon atoms bonded to the metal atoms or oxygen atoms, as described above. Examples of such backbones include the following backbones (a) and (b).

(a) A backbone (referred to hereinbelow as "an organic/inorganic hybrid-based backbone") that comprises organic groups having one or more carbon atoms, also comprises two or more metal atoms bonded to the same or different carbon atoms in the organic groups, and further comprises one or more oxygen atoms bonded to the metal atoms.

(b) A backbone (referred to hereinbelow as "a surface-modified organic/inorganic complex backbone") in which an organic group having one or more carbon atoms is bonded to the metal atoms or oxygen atoms in an inorganic backbone comprising metal atoms and oxygen atoms bonded to metal atoms.

A solid electrolyte having the organic/inorganic hybrid-based backbone (a) will be described next.

The organic groups in the organic/inorganic hybrid-based backbone must have a valence of 2 or greater in order to be able to bond with two or more metal atoms. Examples of such organic groups include bivalent and higher-valence organic groups produced by desorbing two or more hydrogen atoms from an alkane, alkene, alkyl, benzene, cycloalkane, or other hydrocarbon. The organic/inorganic hybrid-based backbone pertaining to the present invention may contain a single type of such organic group, or it may contain two or more types of such groups.

In the present invention, the valence of the organic groups is preferably 2 because a solid electrolyte having an adequate degree of crosslinking can be obtained in this case. Examples of such bivalent organic groups include the methylene group ($-CH_2-$), ethylene group ($-CH_2CH_2-$), trimethylene group ($-CH_2CH_2CH_2-$), tetramethylene group ($-CH_2CH_2CH_2CH_2-$), 1,2-butylene group ($-CH(C_2H_5)CH-$), 1,3-butylene group ($-CH(CH_3)CH_2CH_2-$), phenylene group ($-C_6H_4-$), diethyl phenylene group ($-C_2H_4-C_6H_4-C_2H_4-$), vinylene group ($-CH=CH-$), propenylene group ($-CH_2-CH=CH_2-$), butenylene group ($-CH_2-CH=CH-CH_2-$), amido group ($-CO-NH-$), dimethylamino group ($-CH_2-CH=CH-CH_2-$), amido group ($-CO-NH-$), dimethylamino group ($-CH_2-NH-CH_2-$), and trimethylamine group ($-CH_2-N(CH_3)-CH_2-$). Among these, the methylene group, ethylene group, and phenylene group are preferred because of their ability to produce highly crystalline porous particles.

Two or more metal atoms may be bonded to the same or different carbon atoms in the aforementioned organic groups, and no particular limitations are imposed on the types of these metal atoms, examples of which include silicon, aluminum, titanium, magnesium, zirconium, tantalum, niobium, molybdenum, cobalt, nickel, gallium, beryllium, yttrium, lanthanum, hafnium, tin, lead, vanadium, and boron. Among these, silicon, aluminum, and titanium are preferred because of their good bonding with organic groups and oxygen. The aforementioned metal atoms bond with the organic groups, and also bond with oxygen atoms to form oxides. These oxides may be complex oxides comprising two or more types of metal atoms.

The organic/inorganic hybrid-based backbone is formed by the bonding of the aforementioned organic groups, metal atoms, and oxygen atoms, and the type of bond is not limited in any particular way and may be a covalent bond or ion bond. Solid electrolytes having various backbones (linear, ladder-type, reticulate, branched, or the like) form depending on the number of metal atoms bonded to the organic groups or on the number of oxygen atoms bonded to the metal atoms.

In an organic/inorganic hybrid-based backbone, the organic groups are bonded with two or more metal atoms, and these metal atoms are bonded with one or more oxygen atoms, so the organic groups are incorporated into the backbone of the metal oxide. As a result, the solid electrolyte pertaining to the present invention exhibits both organic and inorganic surface characteristics.

Among such organic/inorganic hybrid-based backbones, a backbone comprising at least one type of structural unit expressed by General Formula (1) below is preferred.

[Chemical Formula 1]

In Eq. (1) hereinabove, $R^1$ is an organic group having one or more carbon atoms, and M is a metal atom. Specific examples of $R^1$ and M include the groups and atoms referred to in the descriptions of the aforementioned organic groups and metal atoms.

Also in Eq. (1) above, $R^2$ indicates a hydrogen atom, a hydroxyl group, or a hydrocarbon group. No limitations are imposed on the type of $R^2$ when it is a hydrocarbon group. Examples of $R^2$ include alkyl groups with a carbon number of 1 to 10, alkenyl groups with a carbon number of 1 to 10, phenyl groups, and substituted phenyl groups.

Furthermore, the x in Eq. (1) above indicates an integer obtained by subtracting one from the valence of the metal M, n indicates an integer no less than 1 and no more than x, and m indicates an integer of 2 or greater. The $R^1$ carbons to which M is bonded may be the same or different. In addition, "—$O_{1/2}$—" indicates a group that forms "—O—" when two such groups bond together.

When the $R^1$, M, $R^2$, n, and m in Eq. (1) hereinabove are an ethylene group, silicon atom, methyl group, 1, and 2, respectively, General Formula (1) is expressed by Chemical Formula (2) below, and a backbone in which two of the structural units of Chemical Formula (2) link together is expressed by Chemical Formula (3) below.

[Chemical Formula 2]

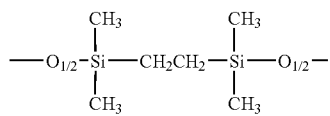

(2)

[Chemical Formula 3]

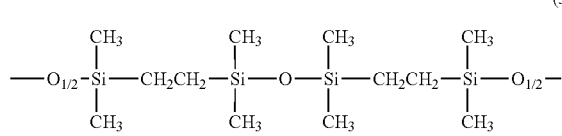

(3)

In addition, Eq. (1) is expressed by Chemical Formula (4) below, and a reticulate structure is formed when a plurality of the structural units of Chemical Formula (4) link together in a case in which the $R^1$, M, n, and m in Eq. (1) above are an ethylene group, silicon atom, 3, and 2, respectively. Furthermore, a case in which four of the structural units of Chemical Formula (4) are linked together is shown by Chemical Formula (5) below as an example of such a reticulate structure.

[Chemical Formula 4]

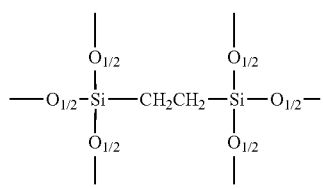

(4)

[Chemical Formula 5]

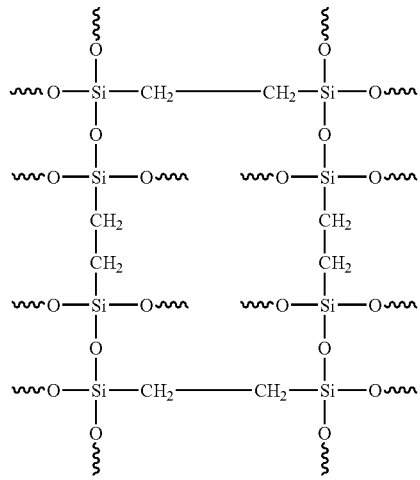

(5)

The organic/inorganic hybrid-based backbone pertaining to the present invention may comprise a plurality of structural units for which the $R^1$, M, $R^2$, n, and m in Eq. (1) above are different. For example, the backbone may comprise the structural units expressed by Chemical Formula (2) above and the structural units expressed by Chemical Formula (4) above. When the solid electrolyte pertaining to the present invention has the structural units expressed by General Formula (1) above as the organic/inorganic hybrid-based backbone, the backbone may also have, for example, Si—$(O_{1/2})_4$—, Ti—$(O_{1/2})_4$—, and other structural units in addition to the aforementioned structural units.

A solid electrolyte having an organic/inorganic hybrid-based backbone may, for example, be obtained by the polycondensation of at least one of the compounds expressed by General Formula (6) below.

[Chemical Formula 6]

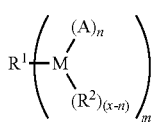

(6)

In Eq. (6) herein, the $R^1$, M, and $R^2$ are the same as the corresponding $R^1$, M, and $R^2$ in General Formula (1) above. In addition, A indicates an alkoxyl group or a halogen atom, x is an integer obtained by subtracting 1 from the valence of the metal M, n is an integer no less than 1 and no more than x, and m indicates an integer of 1 or greater. The $R^1$ carbons to which M is bonded may be the same or different.

When the A in Eq. (6) above is an alkoxyl group, the type of hydrocarbon group bonded to the oxygen in the alkoxyl group is not limited in any particular way and may, for example, be a chain, cyclic, or alicyclic hydrocarbon group. The hydrocarbon group is preferably a chain alkyl group with a carbon number of 1 to 5, and more preferably a methyl group or ethyl group.

Furthermore, when the A in Eq. (6) above is a halogen atom, the type of atom is not limited in any particular way and may, for example, be a chlorine atom, bromine atom, fluorine atom, or iodine atom, of which chlorine and bromine are preferred.

For example, the compound expressed by Eq. (6) above is 1,2-bis(trimethoxysilyl)benzene, which is expressed by $(CH_3O)_3Si—C_6H_4—Si(OCH_3)_3$, when the $R^1$, M, A, n, and m in Eq. (6) are a phenyl group, silicon, methoxy group, 3, and 2, respectively.

In addition, the compound expressed by Eq. (6) above is 1,2-bis(trichlorosilyl)benzene, which is expressed by $Cl_3Si—C_6H_4—SiCl_3$, when the $R^1$, M, A, n, and m in Eq. (6) are, for example, a phenyl group, silicon, chlorine, 3, and 2, respectively.

In the present invention, an alkoxysilane, titanium alkoxide, aluminum alkoxide, or the like may be further added to and polycondensed with the compound expressed by General Formula (6).

Tetramethoxysilane, tetraethoxysilane, tetrapropoxysilane, or the like may be used as the alkoxysilane. It is also possible to use an alkoxysilane having amino groups, carboxyl groups, mercapto groups, epoxy groups, and other functional groups.

Titanium butoxide, titanium isopropoxide, or titanium ethoxide may, for example, be used as the titanium alkoxide; and aluminum isopropoxide may, for example, be used as the aluminum alkoxide. It is also possible to use silicon chloride ($SiCl_4$) and various other meal halides.

An $SiO_2$—$Al_2O_3$ backbone may also be introduced by adding pseudo-boehmite, sodium aluminate, aluminum sulfate, dialkoxyaluminotrialkoxysilane, or the like and reacting it with the compound expressed by Eq. (6) above, with an alkoxysilane, or the like. V, B, and Mn may be further introduced into the backbone by adding and reacting vanadyl sulfate ($VOSO_4$), boric acid ($H_3BO_3$), manganese chloride ($MnCl_2$), and the like.

A method for producing a solid electrolyte having an organic/inorganic hybrid-based backbone will be described next.

When a solid electrolyte having an organic/inorganic hybrid-based backbone is produced, the compound expressed by Eq. (6) above should be added to a surfactant-containing aqueous solution and polycondensed under acidic or alkaline conditions.

The surfactant may be a cationic, anionic, nonionic, or other surfactant. Fatty acid salts, alkylsulfonates, alkylphosphates, polyethylene-oxide-based nonionic surfactants, primaryalkylamines, and the like can be cited in addition to alkyltrimethylammonium $[C_nH_{2n+1}N(CH_3)_3]$, alkylammonium, dialkyldimethylammonium, and benzylammonium chlorides, bromides, iodides, hydroxides, and the like as such surfactants. A compound in which the alkyl groups have a carbon number of 8 to 18 is preferably used as the alkyltrimethylammonium $[C_nH_{2n+1}N(CH_3)_3]$.

A polyethylene-oxide-based nonionic surfactant that has a hydrocarbon group as the hydrophobic component, and a polyethylene oxide chain as the hydrophilic component can be cited as an example of a nonionic surfactant. Examples of such surfactants include $C_{16}H_{33}(OCH_2CH_2)_2OH$, $C_{12}H_{25}(OCH_2CH_2)_4OH$, $C_{16}H_{33}(OCH_2CH_2)_{10}OH$, $C_{16}H_{33}(OCH_2CH_2)_{20}OH$, $C_{18}H_{37}(OCH_2CH_2)_{10}OH$, $C_{18}H_{35}(OCH_2CH_2)_{10}OH$, and $C_{12}H_{25}(OCH_2CH_2)_{23}OH$.

It is also possible to use a surfactant that has a sorbitan fatty acid ester component and a polyethylene oxide component. Examples of such surfactants include Triton X-100 (Aldrich), polyethylene oxide (20) sorbitan monolaurylate (Tween 20, Aldrich), polyethylene oxide (20) sorbitan monopalmitate (Tween 40), polyethylene oxide (20) sorbitan monostearate, polyethyleneoxide (20) sorbitan monooleate (Tween 60), and sorbitan monopalmitate (Span 40).

Triblock copolymers comprising three polyalkylene oxide chains may also be used as such surfactants. Among these copolymers, a triblock copolymer expressed as "polyethylene oxide (EO) chain/polypropylene oxide (PO) chain/polyethylene oxide (EO) chain" is preferred. This triblock copolymer can be expressed as $(EO)_x(PO)_y(EO)_x$, where x is the number of repeating EO chains, and y is the number of repeating PO chains. Although no particular restrictions are imposed on the x and y in the triblock copolymer used in the present invention, it is preferable that x be 5 to 110 and y be 15 to 70, and it is even more preferable that x be 15 to 20 and y be 50 to 60.

Triblock copolymers comprising polypropylene oxide (PO) chain/polyethylene oxide (EO) chain/polypropylene oxide (PO) chain $((PO)_x(EO)_y(PO)_x)$ may also be used in preferred practice as such surfactants. Although no particular restrictions are imposed on the x and y herein, it is preferable that x be 5 to 110 and y be 15 to 70, and it is even more preferable that x be 15 to 20 and y be 50 to 60.

Examples of such triblock copolymers include $(EO)_5(PO)_{70}(EO)_5$, $(EO)_{13}(PO)_{30}(EO)_{13}$, $(EO)_{20}(PO)_{30}(EO)_{20}$, $(EO)_{26}(PO)_{39}(EO)_{26}$, $(EO)_{17}(PO)_{56}(EO)_{17}$, $(EO)_{17}(PO)_{58}(EO)_{17}$, $(EO)_{20}(PO)_{70}(EO)_{20}$, $(EO)_{80}(PO)_{30}(EO)_{80}$, $(EO)_{106}(PO)_{70}(EO)_{106}$, $(EO)_{100}(PO)_{39}(EO)_{100}$, $(EO)_{19}(PO)_{33}(EO)_{19}$, and $(EO)_{26}(PO)_{36}(EO)_{26}$. Among these, it is preferable to use $(EO)_{17}(PO)_{56}(EO)_{17}$ and $(EO)_{17}(PO)_{58}(EO)_{17}$. These triblock copolymers are available from BASF and other companies, and triblock copolymers having desirable x- and y-values can be obtained on a small-scale production level. The aforementioned triblock copolymers may be used singly or as combinations of two or more copolymers.

It is also possible to use a star diblock copolymer in which two polyethylene oxide (EO) chains/polypropylene oxide (PO) chains are bonded in a corresponding manner to the two nitrogen atoms of ethylenediamine. Examples of such star diblock copolymers include $((EO)_{113}(PO)_{22})_2NCH_2CH_2N((PO)_{22}(EO)_{113})_2$, $((EO)_3(PO)_{18})_2NCH_2CH_2N((PO)_{18}(EO)_3)_2$, and $((PO)_{19}(EO)_{16})_2NCH_2CH_2N((EO)_{16}(PO)_{19})_2$. The aforementioned star diblock copolymers may be used singly or as combinations of two or more copolymers.

A solid electrolyte having an organic/inorganic hybrid-based backbone can be obtained by adding the compound (and an alkoxysilane or other inorganic compound if necessary) expressed by Eq. (6) above to a surfactant-containing aqueous solution, and polycondensing the product under acidic, alkaline, or neutral conditions.

It is also possible to polycondense an organic metal compound (and an inorganic compound if necessary) in the absence of a surfactant under acidic or alkaline conditions to form an oligomer, to then add a surfactant to the aqueous solution containing this oligomer, and to continue the polycondensation under acidic or alkaline conditions.

In a polycondensation performed in the presence of a surfactant, a polycondensation based on alkaline conditions and a polycondensation based on acidic conditions can be carried out in an alternate manner. The sequence of the alkaline conditions and acidic conditions maintained in this case is not limited in any particular way, but the degree of crosslinking tends to increase if the polycondensation is performed first in acidic conditions and then in alkaline conditions. In the polycondensation reaction, stirring and standing are preferably alternated.

The polycondensation reaction temperature is preferably within a range of 0 to 100° C., but lower temperatures tend to enhance the orderliness of the resulting structure. The preferred reaction temperature for making the structure more ordered is 20 to 40° C. On the other hand, higher reaction temperatures tend to increase the degree of polymerization and to make the structure more stable. The preferred reaction temperature for ensuring a higher degree of polymerization is 60 to 80° C.

A porous precursor whose pores remain filled with the surfactant is obtained when the polycondensation reaction is followed by the filtration of the precipitate or gel formed after aging has been conducted, and the product is washed as needed and is then dried.

The porous precursor may be dispersed in water or another electrolyte, or in an aqueous solution containing the same surfactant as that used in the polycondensation reaction (typically, at a surfactant concentration that is the same as or less than that maintained during the polycondensation reaction), and may then be hydrothermally treated at 50 to 200° C. In this case, the solution used in the polycondensation reaction may be heated directly or after being diluted. The heating temperature is preferably 60 to 100° C., and more preferably 70 to 80° C. The corresponding pH is preferably alkaline, and a pH of, for example, 8 to 8.5 is preferred. The time of the hydrothermal treatment, while not subject to any particular limitations, is preferably 1 hour or greater, and more preferably 3 to 8 hours.

Following this hydrothermal treatment, the porous precursor is filtered and then dried to remove excess processing solution. It is also possible to perform stirring for approximately several hours to several tens of hours at room temperature in advance before the porous precursor is dispersed in the aforementioned aqueous solution or solvent, the pH is adjusted, and the hydrothermal treatment is then started.

The surfactant is subsequently removed from the porous precursor. Examples of suitable removal methods include methods based on baking and methods in which the precursor is treated with a solution of water, alcohol, or the like. A solid electrolyte having an organic/inorganic hybrid-based backbone can thus be obtained from the porous precursor.

In the method based on baking, the porous precursor is heated to 300 to 1000° C., and preferably 200 to 500° C. The heating time may be about 30 minutes, but heating for 1 hour or longer is preferred in order to completely remove the surfactant component. The baking may be carried out in air, but because combustion gas is produced in large quantities, nitrogen or another inert gas may also be introduced to carry out the baking.

When the surfactant is removed from the porous precursor using a solvent, the porous material precursor is, for example, dispersed in a solvent that has high solubility with respect to the surfactant, the system is stirred, and the solid fraction is then recovered. Water, ethanol, methanol, acetone, or the like can be used as the solvent.

When a cationic surfactant is used, the porous precursor is dispersed in ethanol or water containing a small amount of added hydrochloric acid, and the system is stirred while heated to 50 to 70° C. The cationic surfactant is thereby caused to participate in an ion-exchange reaction involving protons, and is extracted. When an anionic surfactant is used, the surfactant can be extracted in a solvent containing added anions. When a nonionic surfactant is used, it is possible to perform extraction exclusively with a solvent. Ultrasonic waves are preferably applied during extraction. It is also preferable to combine stirring and standing or to repeat the cycles.

The shape of the solid electrolyte pertaining to the present invention can be controlled by synthesis conditions. The shape of a solid electrolyte reflects the arrangement structure of particle pores, and is determined by factors that are themselves determined by the crystal structure. For example, the crystal structure of spherical particles is a three-dimensional hexagon, and the crystal structure of hexagonal prismatic particles is a two-dimensional hexagon. In addition, the crystal structure of octadecagonal particles is a cube.

Reaction temperature and surfactant length (carbon number) can be cited as synthesis conditions that affect the shape (crystal structure) of a solid electrolyte. When, for example, an alkyltrimethylammonium is used as the surfactant, the reaction temperature and the number of carbons in the alkyl groups thereof have an effect on the shape of the organic/inorganic composite material. For example, hexagonal prismatic particles tend to form when the carbon number of the alkyl groups is 18 at a reaction temperature of 95° C., and octadecagonal particles tend to form when the carbon number of the alkyl groups is 16 at the reaction temperature of 95° C. In addition, a reaction temperature of 25° C. tends to produce spherical particles, both when the carbon number of the alkyl groups is 18 and when the number is 16. On the other hand, a layered structure is obtained when the carbon number of the alkyl groups is 18 at a reaction temperature of 2° C., and spherical particles tend to form when the carbon number of the alkyl groups is 16 at the reaction temperature of 2° C.

A solid electrolyte having the surface-modified organic/inorganic complex backbone (b) will now be described.

The surface-modified organic/inorganic complex backbone (b) is one in which the polymer main chain of the inorganic oxide is composed of metal atoms and oxygen atoms. The metal atoms cited in connection with the above description of a solid electrolyte having an organic/inorganic hybrid-based backbone can be named herein as examples of the metal atoms constituting the main chain. Among these, silicon, aluminum, and titanium are preferred because of their good bonding with organic groups and oxygen. In a surface-modified organic/inorganic complex backbone, metal atoms and oxygen atoms bond together to form an oxide, which may be a complex oxide containing two or more types of metal atoms. The main chain of the inorganic backbone may be linear, branched, ladder-type, or reticulated.

Specific examples of the organic groups in the surface-modified organic/inorganic complex backbone include methyl, ethyl, and other alkyl groups with a carbon number of 1 to 6; and phenyl and other aryl groups with a carbon number of 6 to 12. The bonding positions of these organic groups may be the metal atoms or oxygen atoms that constitute the inorganic backbone.

Following is a description of the method for manufacturing a solid electrolyte having a surface-modified organic/inorganic complex backbone.

No particular restrictions are imposed on the method for manufacturing a solid electrolyte with a surface-modified organic/inorganic complex backbone. When, for example, the silicate backbone —Si—O— is formed, the electrolyte can be obtained by a process in which an organosilane expressed by Eq. (7) below, as well as tetramethoxysilane, tetraethoxysilane, tetrapropoxysilane, or another alkoxysilane, which is used as needed, are polycondensed using a surfactant as a template, and the surfactant is then removed.
[Chemical Formula 7]

$$R\text{—}Si(OR')_3 \qquad (7)$$

In Eq. (7), R is an alkyl group with a carbon number of 1 to 6, or an aryl group with a carbon number of 6 to 12; and R' is a methyl or ethyl group.

In addition, the aforementioned alkoxysilane or inorganic backbone components such as sodium silicate and kanemite ($NaHSi_2O_5 \cdot 3H_2O$) are polycondensed using a surfactant, the surfactant is removed to obtain an inorganic porous body, and the aforementioned organosilane or an organohalosilane such as trimethoxychlorosilane [Cl—Si—(OCH$_3$)$_3$] are caused to react with the silanol groups (Si—OH) present on the surface of the inorganic backbone, whereby the organic groups can be introduced on the surface of the inorganic backbone.

An aluminum-containing inorganic backbone can also be formed using pseudo-boehmite, sodium aluminate, aluminumsulfate, dialkoxyaluminotrialkoxysilane, or the like. A metallosilicate-based backbone (SiO$_2$—MO$_{n/2}$) in which various metals (M$^{n+}$, where M is Ti, Zr, Ta, Nb, Sn, Hf, or another metal, and n is the charge on the metal) are contained in the silicate backbone can be obtained using an oxide in which the Si of the inorganic backbone components cited in connection with the formation of the aforementioned silicate backbone are substituted for Ti, Zr, Ta, Nb, Sn, Hf, and other metals.

Specifically, a metallosilicate-based porous body into which Ti, V, B, or Mn has been introduced can be obtained by adding a titanate compound (Ti(OC$_2$H$_5$)$_4$ or the like), vanadium sulfate (VOSO$_4$), boricacid (H$_3$BO$_3$), or manganese chloride (MnCl$_2$) to an alkoxysilane and conducting a copolymerization reaction.

In the formation of a surface-modified organic/inorganic complex backbone, the surfactants cited in connection with the description of the organic/inorganic hybrid-based backbone can be used as a template, and the polycondensation and surfactant removal can be performed in the same manner as when the organic/inorganic hybrid-based backbone is formed.

The solid electrolyte of the present invention has a structure in which functional groups having ion-exchange capabilities are bonded with organic groups in the pores of an organic/inorganic composite material configured as described above, and sufficiently high ionic conductance can be obtained at low temperatures in comparison with stabilized zirconia or another conventional solid electrolyte even when the relative pressure p/p$_0$ of water vapor is less than 1.0.

The functional groups with ion-exchange capabilities that are mentioned herein have the function of facilitating the phenomenon whereby the pores are filled with water or another liquid electrolyte, in addition to having the function of endowing the solid electrolyte pertaining to the present invention with ionic conductance. Specifically, the capillary condensation phenomenon occurs even when functional groups having ion-exchange capabilities are absent from the pores of the solid electrolyte pertaining to the present invention, and placing functional groups having ion-exchange capabilities inside the pores of the solid electrolyte pertaining to the present invention allows the pores to be completely filled with water under conditions in which the relative pressure p/p$_0$ of water vapor is at a lower level.

Specific examples of functional groups having ion-exchange capabilities include the sulfonic acid group, phosphoric acid group, carboxylic acid group, and sulfonimide group. This type of functional group preferably comprises at least one group selected from among the sulfonic acid group (—SO$_3$H), phosphoric acid group (—PO$_4$H$_2$ or >PO$_4$H), and carboxylic acid group (—COOH) because doing so allows the pores to be completely filled with water, and higher ionic conductance to be ensured under conditions in which the relative pressure p/p$_0$ of water vapor is at a lower level.

In addition, the method whereby a functional group having ion-exchange capabilities is bonded with organic groups is not limited in any particular way, and the following three methods can be cited as examples.

In the specific case in which the functional group having ion-exchange capabilities is the sulfonic acid group, it is possible to cite a method that entails the use of fuming sulfuric acid, sulfuric anhydride (acetylated sulfur, SO$_3$), chlorosulfonic acid (chlorosulfuric acid, ClSO$_3$H), or another sulfonation agent. When the functional group having ion-exchange capabilities is the phosphoric acid group, it is possible to cite a method that entails the use of phosphorus oxychloride (POCl$_3$) or another phosphorylation agent, and a method in which a reaction involving triethyl phosphite is conducted following chloromethylation, and the product is hydrolyzed. When the functional group having ion-exchange capabilities is the carboxylic acid group, a group whose side-chain groups or terminal groups are methyl groups is introduced as the organic group, and the methyl group thereof is oxidized.

No particular restrictions are imposed on the shape of the solid electrolyte pertaining to the present invention thus obtained, and the electrolyte may be fashioned into particles and added to the electrolyte membrane, or a solid electrolyte membrane comprising a solid electrolyte may be formed as a thin membrane, as previously described.

According to the method for forming a solid electrolyte membrane comprising a solid electrolyte, a thin film comprising an organic/inorganic composite material that combines the structure of an inorganic material and the structure of an organic material and has pores whose mean pore diameters fall within the previously described range can be formed, for example, by a process in which a sol solution containing a porous precursor is applied to a glass substrate or the like, dried, and baked to remove the surfactant in the above-described step for manufacturing a solid electrolyte; and the product can be appropriately obtained by bonding functional groups having ion-exchange capabilities with the organic groups constituting the backbone of this composite material in accordance with the above-described method.

There is also a method in which a membrane is formed directly from a starting material that contains organic groups without the formation of porous particles. A uniform solution can be prepared by mixing an organic silane starting material, a surfactant, a solvent (water, alcohol, or the like), and a hydrochloride in an appropriate ratio. A uniform transparent membrane can be formed by applying this solution to a specific substrate, and heating and drying the substrate as needed. The method for applying the solution to the substrate is not limited in any particular way and includes dip coating, spin coating, and spraying. Baking and solvent extraction may be used to remove the surfactant from the uniform transparent membrane. In the baking technique, the membrane formed on the substrate is baked at 200 to 600° C. With solvent extraction, the process is conducted by dipping membrane formed on the substrate in a solution obtained by adding hydrochloric acid to ethanol or another solvent.

When the solid electrolyte pertaining to the present invention is dispersed in particulate form in another electrolyte different from the solid electrolyte particles, a proton-conducting polymer electrolyte is preferably used as the other electrolyte different from the solid electrolyte particles.

Examples of such polymer electrolytes include perfluorosulfonic acid, perfluorophosphonic acid, polystyrene sulfonic acid, polyvinyl benzyl phosphonic acid, polytrifluorostyrene sulfonic acid, and other homopolymers or copolymers; ethylene/tetrafluoroethylene copolymers, polytetrafluoroethylene, tetrafluoroethylene/hexafluoropropylene copolymers, polyvinylidene fluoride, hexafluoropropylene/vinylidene fluoride copolymers, ethylene/chlorotrifluoroethylene copolymers, and other sulfonated or methylphosphonated graft polymers obtained by the graft polymerization of styrene or trifluorostyrene with fluororesins; and polysulfone sulfonic acid membranes, polyether ether ketone sulfonic acid membranes, polyparaphenylene derivative sulfonic acid membranes, and other hydrocarbon-based polymers.

Products synthesized by the conventionally known art, or commercially available products may be used as such polymer electrolytes. In the case of perfluorosulfonic acid, for example, it is possible to use a product obtained by copolymerizing tetrafluoroethylene and a perfluoroalkyl sulfonic acid vinyl ether under specific conditions, or a commercially available product such as Aciplex, Nafion, or Flemion.

Herein, when the solid electrolyte pertaining to the present invention is fashioned into particles and dispersed in another electrolyte different from these solid electrolyte particles to form an electrolyte membrane, the content of the solid electrolyte particles is not limited in any particular way as long as the excellent ionic conductance thereof is not compromised, although a content of 40 to 80 mass % is preferred, based on the total mass of the electrolyte membrane in a dry state. Bringing the content of the solid electrolyte in the electrolyte membrane in this case below the aforementioned lower limit tends to fail to produce sufficiently high ionic conductance when the relative pressure $p/p_0$ of water vapor is less than 1.0, whereas raising the content above the aforementioned upper limit tends to impede membrane molding and to reduce the membrane strength.

In addition, the numerical density of pores in an arbitrary plane parallel to the plane in contact with the anode of the electrolyte membrane pertaining to the present invention is preferably set to $1 \times 10^{11}$ pores/cm$^2$ or greater from the standpoint of providing the electrolyte membrane with adequate ionic conductance both when the membrane is formed from a solid electrolyte alone and when the solid electrolyte is dispersed in another electrolytic substance and fashioned into a thin membrane. Keeping the pore density below $1 \times 10^{11}$ pores/cm$^2$ tends to fail to yield sufficiently high ionic conductance when the relative pressure $p/p_0$ of water vapor is less than 1.0.

Furthermore, the moisture content of the electrolyte membrane pertaining to the present invention in an environment in which the relative pressure $p/p_0$ of water vapor is 0.6 or less is preferably kept at 10 to 100 mass %, based on the total mass of the electrolyte membrane in a dry state, from the standpoint of providing the membrane with adequate ionic conductance both when the membrane is formed from a solid electrolyte alone and when the solid electrolyte is dispersed in another electrolytic substance and fashioned into a thin membrane. Bringing the moisture content below the aforementioned lower limit tends to fail to produce sufficiently high ionic conductance when the relative pressure $p/p_0$ of water vapor is 0.6 or less, whereas raising the content above the aforementioned upper limit tends to impede membrane molding and to reduce the membrane strength.

The anode 10 and cathode 20 will be described next. The anode 10, which is a gas diffusion electrode, comprises a gas diffusion layer 12 and a catalyst layer 11 formed on the gas diffusion layer 12. The cathode 20, which also is a gas diffusion electrode, comprises a gas diffusion layer 22 and a catalyst layer 21 formed on the gas diffusion layer 22.

The gas diffusion layer 12 and gas diffusion layer 22 play the role whereby the anode reaction gas or cathode reaction gas that is fed to the membrane electrode assembly 1 proceeds to the catalyst layer in a smooth and uniform manner, and electrons produced by the electrode reactions at the catalyst layers 11 and 21 are released to the external circuit (not shown) of the membrane electrode assembly 1; and also play the role whereby unreacted gas, any excess of the reaction-produced water for humidifying the electrolyte membrane 30, and the like are released outside. A porous electron-conducting body (for example, carbon cloth or carbon paper in which a layer comprising a water repellent and carbon powder is formed on the surface) can, for example, be used as the structural material of the gas diffusion layers 12 and 22.

The catalyst layer 11 of the anode 10 is the reaction site for sustaining the electrode reaction given by Eq. (I) above. On the other hand, the catalyst layer 21 of the cathode in the fuel cell 2 is the reaction site for sustaining the electrode reaction given by Eq. (II) above. The manner in which the catalyst layer 11 of the anode 10 and the catalyst layer 21 of the cathode are configured is not limited in any particular way as long as these layers contain a catalyst for promoting the corresponding electrode reactions and have gas diffusion properties and electrical conductivity. For example, the layers may comprise as their principal components a porous carrier (microparticulate carbon black) of large surface area that supports catalyst particles (Pt particles, Pt alloy particles, or the like), and an ion-exchange resin (perfluorocarbon sulfonic acid polymer or the like) or other polymer electrolyte that covers the carrier. The materials for these catalyst, carrier, and polymer electrolyte are not limited in any particular way, and a variety of materials can be used in accordance with the intended application.

As previously described, the catalyst layer 11 of the anode 10 and/or the catalyst layer 21 of the cathode may also be configured without the addition of an ion-exchange resin. A water repellent (fluororesin or the like) may also be added as needed to the catalyst layer 11 and catalyst layer 21.

An anode separator 40 and a cathode separator 50 are mounted one each on the side of the anode 10 and on the side of the cathode 20 in each membrane electrode assembly 1, as shown in FIG. 2. The separator 40 and separator 50 may, for example, be formed from a gas-impermeable, electron-conducting member such as dense carbon that has been rendered impermeable to gas by the compaction of carbon, and has been fashioned into a thin rectangular plate, as shown in FIG. 2.

In addition, grooves 70 formed in the surface along which the anode separator 40 is kept in contact with the anode 10 define anode reaction gas channels 41 together with the surface of the anode 10 of the membrane electrode assembly 1 (see FIG. 2). Grooves 72 formed in the cathode contact surface of the cathode separator 50 define cathode reaction gas channels 51 together with the surface of the cathode 20 of the membrane electrode assembly 1 (see FIG. 2).

In addition, insulating members (not shown) are disposed in portions other than the portions of the membrane electrode assembly 1 disposed between the anode separator 40 and cathode separator 50 to prevent electric contact between the anode separator 40 and cathode separator 50.

Furthermore, at least one of the anode separator 40 and cathode separator 50 is provided as needed with a fluid channel (not shown) for a fluid (for example, liquid-state water) used to adjust the temperature of the membrane electrode assembly 1 during operation.

In addition, the external output terminal 80 is a terminal for outputting to the outside the electrons generated by the electrode reactions occurring at the anode, and the external output terminal 90 is a terminal for feeding to the outside the electrons needed to sustain electrode reactions at the anode. The constituent materials or shapes of the external output terminal 80 and external output terminal 90 are not limited in any particular way as long as these terminals have electron conductivity.

A method for manufacturing the membrane electrode assembly 1 will be described next. The method for manufacturing the membrane electrode assembly 1 is not limited in any particular way, and the assembly may be formed by conventional art. For example, the manufacturing can be carried out in accordance with the following formation method when the catalyst layer 11 and catalyst layer 21 are made to contain a polymer electrolyte.

The first method for forming the catalyst layer 11 and catalyst layer 21 is a formation method in which pastes (or inks) containing constituent materials for the catalyst layer 11 and catalyst layer 21 are first prepared, and each paste (or ink) is subsequently formed to a uniform thickness by spraying, application, filtration transfer, or the like on both sides of an electrolyte membrane 30 fabricated by the previously described method. Here, it is also possible to use a so-called transfer technique, in which the catalyst layer 11 and catalyst layer 21 are formed by application or the like on a PTFE, polyethylene terephthalate, or other substrate plate prepared in advance, and these are then transferred to an electrolyte membrane 30 by hot pressing or the like. Bonding is then accomplished between the electrolyte membrane 30, which is provided with the catalyst layer 11 and catalyst layer 21, and the gas diffusion layer 12 and gas diffusion layer 22, which are composed of carbon cloth or another material that has been rendered water repellent. It is possible to bring the gas diffusion layer 12 and catalyst layer 11, as well as the gas diffusion layer 22 and the catalyst layer 21, into contact with each other without bonding.

The second method for forming the catalyst layer 11 and catalyst layer 21 is a method in which each paste (or ink) is formed to a uniform thickness by spraying, application, filtration transfer, or the like on the surfaces of the gas diffusion layer 12 or gas diffusion layer 22, which comprises carbon cloth or another material that has been rendered water repellent. It is also possible to use a transfer technique in which the catalyst layer 11 and catalyst layer 21 are formed by application or the like on a PTFE, polyethylene terephthalate, or other substrate plate prepared in advance, and these are then transferred to the gas diffusion layer 12 or gas diffusion layer 22 by hot pressing or the like. Bonding is then accomplished between the electrolyte membrane 30 fabricated by the previously described method is bonded, the gas diffusion layer 12 provided with the catalyst layer 11, and the gas diffusion layer 22 provided with the catalyst layer 21. It is possible to bring the electrolyte membrane 30, catalyst layer 11, and catalyst layer 21 into contact with each other without bonding.

The bonding in the aforementioned two methods is not limited in any particular way and may, for example, be accomplished by hot pressing or roll pressing. It is further possible to bond the two components with the aid of an adhesive without heating.

When the catalyst layer 11 and catalyst layer 21 are configured without the addition of a polymer electrolyte, catalyst particles and particles of an electroconductive porous body may, for example, be concurrently vapor-deposited by sputtering or the like on the surface of the electrolyte membrane 30 fabricated by the previously described method to form the product.

The membrane electrode assembly 1 is completed by the aforementioned method or the like. The membrane electrode assembly 1 is disposed between the separator 40 and separator 50 in the state shown in FIG. 2, an insulating member (not shown) is provided as needed to prevent electric contact between the anode separator 40 and cathode separator 50, an external output terminal 80 is electrically connected to the anode separator 40, and an external output terminal 90 is electrically connected to the cathode separator 50, completing the fuel cell 2.

[Second Embodiment]

Figure 3:
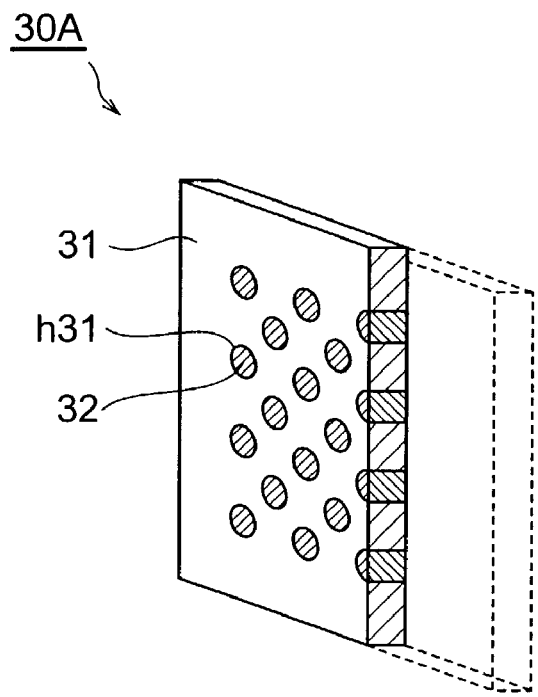
FIG. 3 is an exploded perspective view depicting the structure of an electrolyte membrane pertaining to a second embodiment of the membrane electrode assembly of the present invention.

A second embodiment of the membrane electrode assembly of the present invention will be described next. FIG. 3 is an exploded perspective view depicting the structure of an electrolyte membrane pertaining to a second embodiment of the membrane electrode assembly of the present invention. The membrane electrode assembly (not shown) has the same structure as the membrane electrode assembly 1 shown in FIG. 1, except for comprising the electrolyte membrane 30A shown in FIG. 4.

The electrolyte membrane 30A comprises a support element 31 that is shaped as a plate and has at least one communicating hole h31 that penetrates all the way from the surface in contact with the anode 10 (not shown) to the surface in contact with the cathode 20 (not shown), and an ion-conducting element 32 that comprises an electrolytic material packed into each communicating hole h31. The ion-conducting element 32 contains the solid electrolyte pertaining to the present invention.

In this case as well, the ion-conducting element 32 may comprise exclusively the solid electrolyte pertaining to the present invention, or the solid electrolyte and another electrolyte different from this solid electrolyte. The previously cited ion-conducting polymer electrolytes are preferred for the other electrolyte.

The cross-sectional surface area of the communicating holes h31 in the support element 31 is preferably 0.2 to 30,000 $nm^2$. Keeping the cross-sectional surface area of the communicating holes h31 below 0.2 $nm^2$ is unsuitable because of an increased tendency of the ionic conductance to be adversely affected. In addition, raising the cross-sectional surface area of the communicating holes h31 above 30,000 $nm^2$ is unsuitable because of a reduction in the ionic conductance of the entire electrolyte membrane 30A and a reduced likelihood that the capillary condensation phenomenon will occur in the pores. The cross-sectional surface area of the communicating holes h31 is more preferably 0.2 to 100 $nm^2$.

In addition, the numerical density of the communicating holes h31 in an arbitrary plane parallel to the plane in contact with the anode 10 of the electrolyte membrane 30A is preferably $1 \times 10^9$ pores/$cm^2$ or greater, and more preferably $3 \times 10^{10}$ pores/$cm^2$ or greater, from the standpoint of endowing the electrolyte membrane 30A with high ionic conductance while maintaining the mechanical strength of the support element 31.

Herein, when the solid electrolyte pertaining to the present invention is fashioned into particles and dispersed in another electrolyte different from these solid electrolyte particles to form the ion-conducting element 32, the content of the solid electrolyte particles is not limited in any particular way as long as the excellent ionic conductance thereof is not compromised, although a content of 40 to 80 mass % is preferred, based on the total mass of the ion-conducting element 32 in a dry state. Bringing the content of the solid electrolyte in the ion-conducting element 32 in this case below the aforementioned lower limit tends to fail to produce sufficiently high ionic conductance when the relative pressure $p/p_0$ of water vapor is less than 1.0, whereas raising the content above the aforementioned upper limit tends to make it more difficult to mold the ion-conducting element 32 and to reduce the mechanical strength of the ion-conducting element 32.

In addition, the numerical density of pores in an arbitrary plane parallel to the plane in contact with the anode of the ion-conducting element 32 is preferably set to $1\times10^{11}$ pores/cm$^2$ or greater from the standpoint of providing the ion-conducting element 32 with adequate ionic conductance both when the element is formed from a solid electrolyte alone and when the solid electrolyte is dispersed in another electrolytic substance. Keeping the pore density below $1\times10^{11}$ pores/cm$^2$ tends to fail to yield sufficiently high ionic conductance when the relative pressure $p/p_0$ of water vapor is less than 1.0.

Furthermore, the moisture content of the ion-conducting element 32 in an environment in which the relative pressure $p/p_0$ of water vapor is 0.6 or less is preferably kept at 10 to 100 mass %, based on the total mass of the electrolyte membrane in a dry state, from the standpoint of providing the element with adequate ionic conductance both when the membrane is formed from a solid electrolyte alone and when the solid electrolyte is dispersed in another electrolytic substance and fashioned into a thin membrane. Bringing the moisture content below the aforementioned lower limit tends to fail to produce sufficiently high ionic conductance when the relative pressure $p/p_0$ of water vapor is 0.6 or less, whereas raising the content above the aforementioned upper limit tends to make it more difficult to mold the ion-conducting element 32 and to reduce the mechanical strength of the ion-conducting element 32.

The cross-sectional shape of the communicating holes h31 is not limited in any particular way. It may, for example, be circular, oval, polygonal, gourd-shaped, or star-shaped. Furthermore, the communicating holes can have any shape as long as they penetrate all the way from the surface in contact with the anode 10 to the surface in contact with the cathode 20, and may, for example, be formed so as to penetrate in a direction substantially parallel to the normal direction to the surface in contact with the anode 10 of the electrolyte membrane 30A, or to have a specific inclination with respect to the normal direction. For example, the communicating holes h31 may be linear or zigzagged. From the standpoint of ease of manufacture, the communicating holes h31 should preferably penetrate in a direction substantially parallel to the normal direction to the surface in contact with the anode 10 of the electrolyte membrane 30A.

The material constituting the support element 31 is not limited in any particular way as long as such communicating holes h31 can be formed. For example, it may be a polymer material, an inorganic material, or a composite of the two. Specific preferred examples of the support element 31 include alumina films provided with communicating holes h31, and polycarbonate films in which the communicating holes h31 are formed by means of electron beam irradiation and a solvent.

Figure 4:
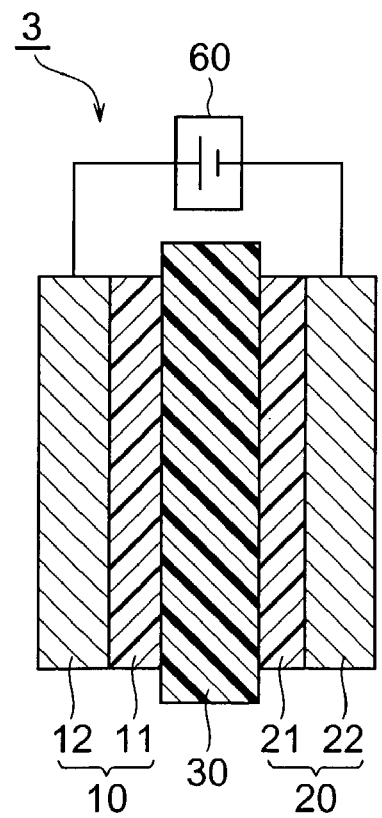
FIG. 4 is a schematic cross-sectional view depicting a preferred embodiment of an electrolytic cell comprising the membrane electrode assembly shown in FIG. 1.

A preferred embodiment of an electrolytic cell comprising the membrane electrode assembly shown in FIG. 1 will be described next. FIG. 4 is a schematic cross-sectional view depicting a preferred embodiment of an electrolytic cell comprising the membrane electrode assembly shown in FIG. 1. The electrolytic cell 3 has the membrane electrode assembly 1 shown in FIG. 1, and also has a voltage application element 60 for applying a specific voltage between the anode 10 and cathode 20 of the membrane electrode assembly 1, as shown in FIG. 4.

The voltage application element 60 comprises a power supply (not shown) and a voltage control circuit (not shown) for controlling the application voltage fed between the anode 10 and cathode 20 from the power supply.

The oxidation reaction involving water that is shown by Eq. (IV) below can be sustained at the anode, and the reduction reaction between hydrogen ions and oxygen shown by Eq. (V) below can be sustained at the cathode by adjusting the application voltage applied between the anode 10 and cathode 20 of the voltage application element 60 when the electrolytic cell 3 is mounted in the atmosphere.

$$2H_2O \rightarrow 4H^+ + O_2 + 4e^- \qquad (IV)$$

$$4H^+ + O_2 + 4e^- \rightarrow 2H_2O \qquad (V)$$

Consequently, depending on the arrangement conditions for the surface on the side not in contact with the electrolyte membrane 30 of the anode 10 and for the surface on the side not in contact with the electrolyte membrane 30 of the cathode 20, the electrolytic cell 3 can be used as a dehumidifying apparatus or a humidifying apparatus because the space on the side of the anode 10 can be dehumidified and the space on the cathode side can be humidified.

The membrane electrode assembly 1 used herein can be endowed with high electrolysis efficiency and operated at a lower application voltage than when a conventional membrane electrode assembly provided with a polymer electrolyte membrane is used in the aforementioned application because the water vapor in the atmosphere can be readily introduced and retained in the pores of the electrolyte membrane by the previously described capillary condensation phenomenon, making it possible to ensure adequate ionic conductance. It is also possible to reduce the size of the entire power generation system by using this membrane electrode assembly 1 in the same manner as the previously described fuel cell.

The reduction reaction involving hydrogen ions shown by Eq. (VI) below can be sustained at the cathode by adjusting the application voltage in accordance with the usage. Performing the reaction shown by Eq. (V) at the cathode is preferred from the standpoint of operating the electrolytic cell 3 under conditions of reduced power consumption.

$$2H^+ + 2e^- \rightarrow H_2 \qquad (VI)$$

The magnitude of the application voltage applied by the voltage application element 60 in order to sustain the electrode reactions expressed by Eqs. (IV) and (V) above is theoretically or empirically established in an appropriate manner by taking into account, for example, thermodynamic data such as the redox potentials of the electrode reactions between the anode 10 and cathode 20 and overvoltage of the corresponding electrode reactions, and, additionally, also taking into account the type of material constituting the anode 10 and cathode 20, the type of material constituting the electrolyte membrane 30 and water content thereof, the ambient temperature or humidity, and other factors in addition to the and other parameters related to the corresponding electrode reactions.

Preferred embodiments of the present invention were described in detailed above, but the present invention is not limited by the above-described embodiments.

Figure 5:
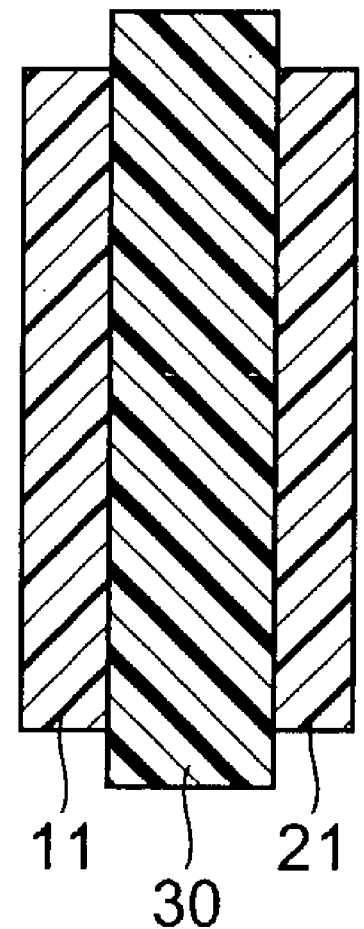
FIG. 5 is a schematic cross-sectional view depicting another embodiment of the membrane electrode assembly shown in FIG. 1.
Figure 6:
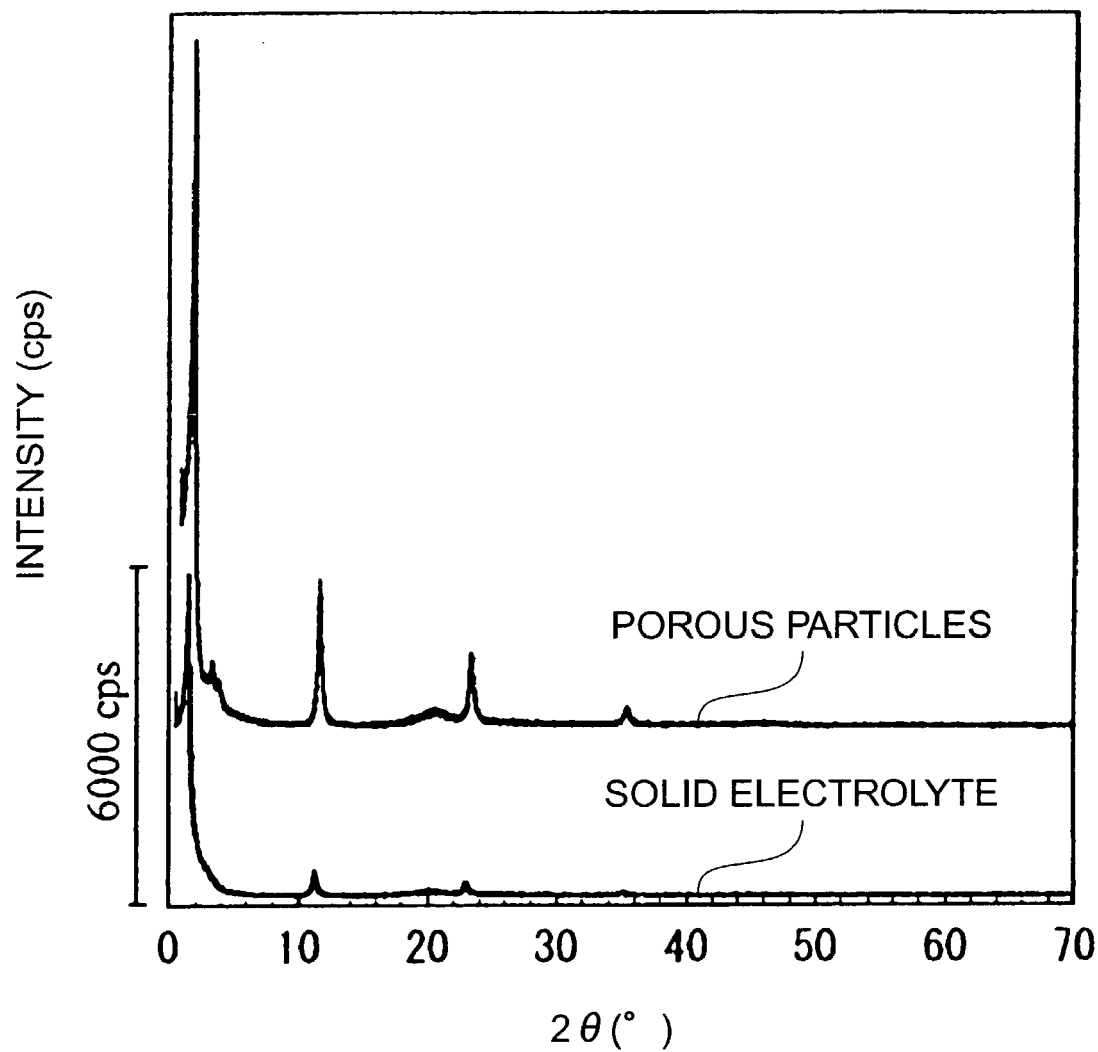
FIG. 6 is a graph depicting X-ray diffraction patterns obtained for the porous particles and solid electrolyte of synthesis example 1.
Figure 7:
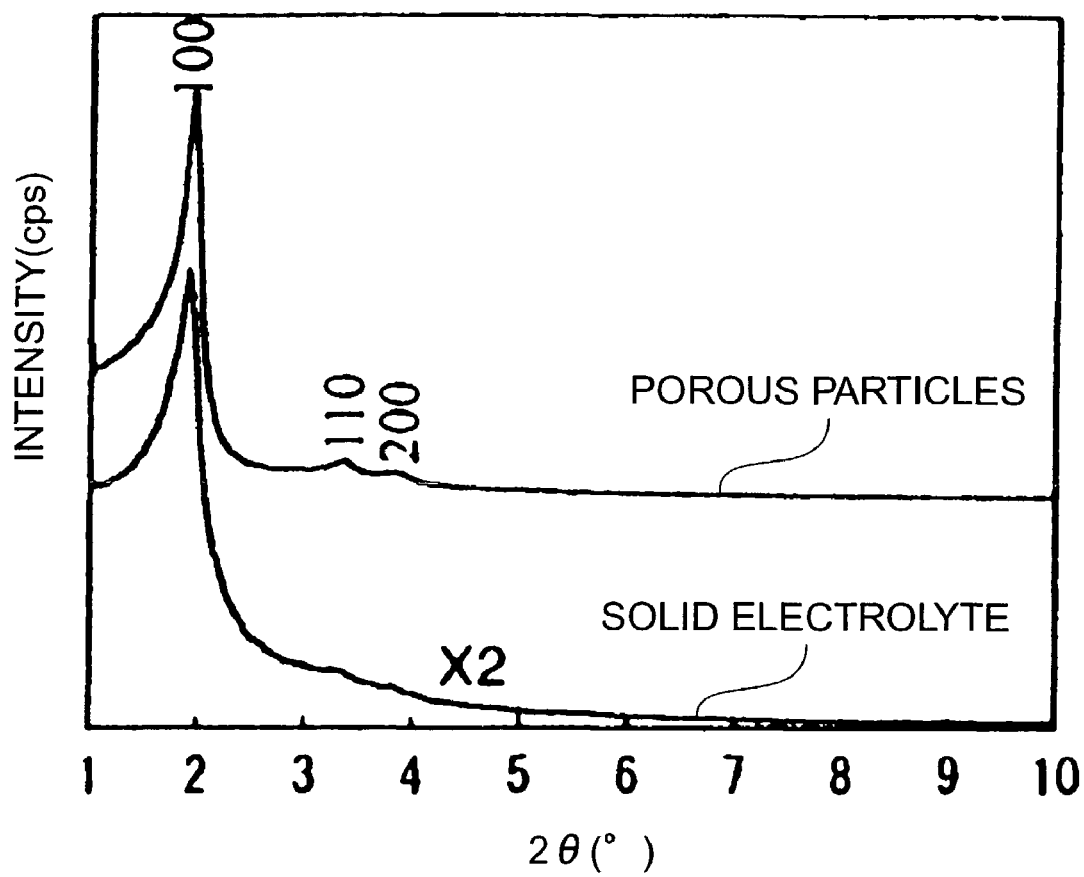
FIG. 7 is a graph depicting X-ray diffraction patterns obtained for the porous particles and solid electrolyte of synthesis example 1.
Figure 8:
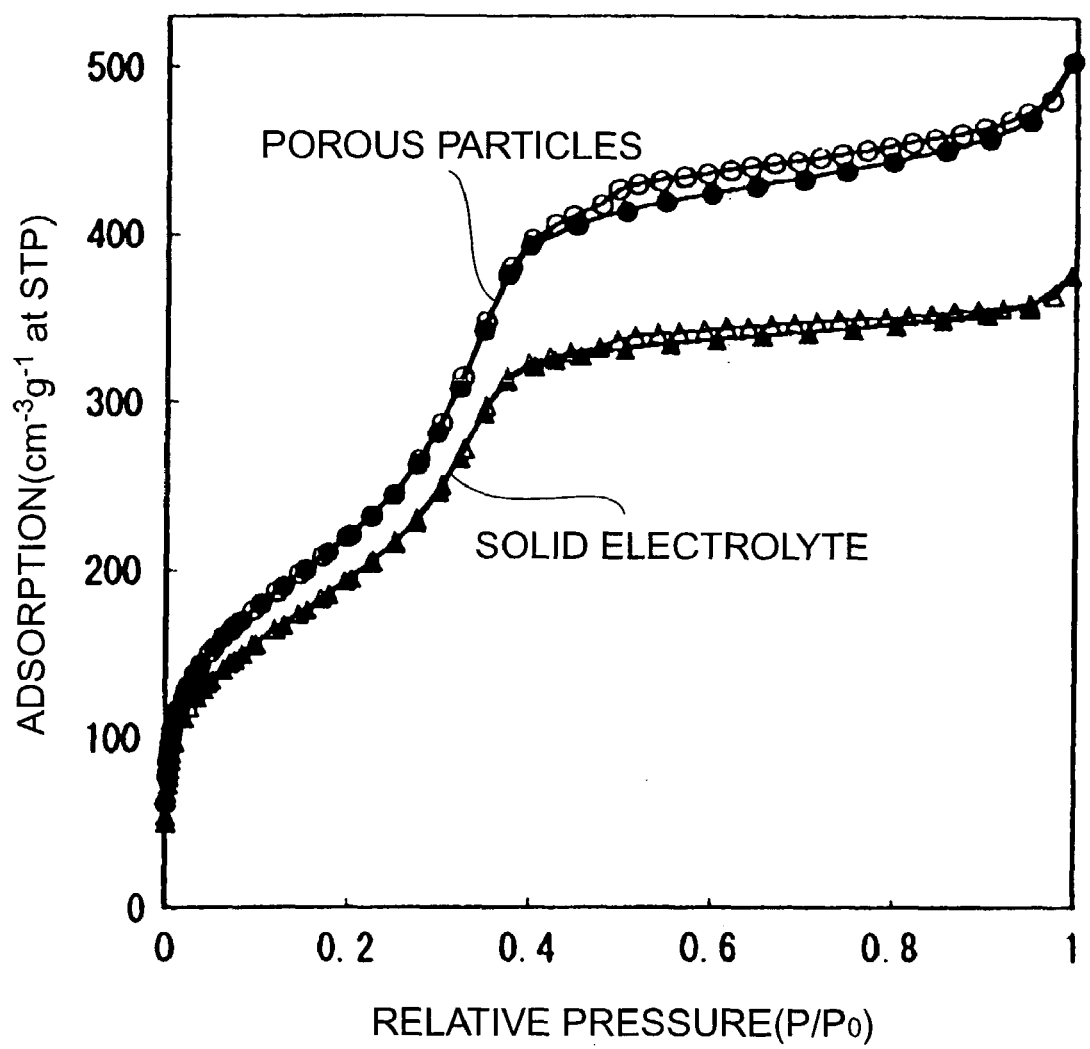
FIG. 8 is a graph depicting nitrogen adsorption isotherms obtained for the porous particles and solid electrolyte of synthesis example 1.
Figure 9:
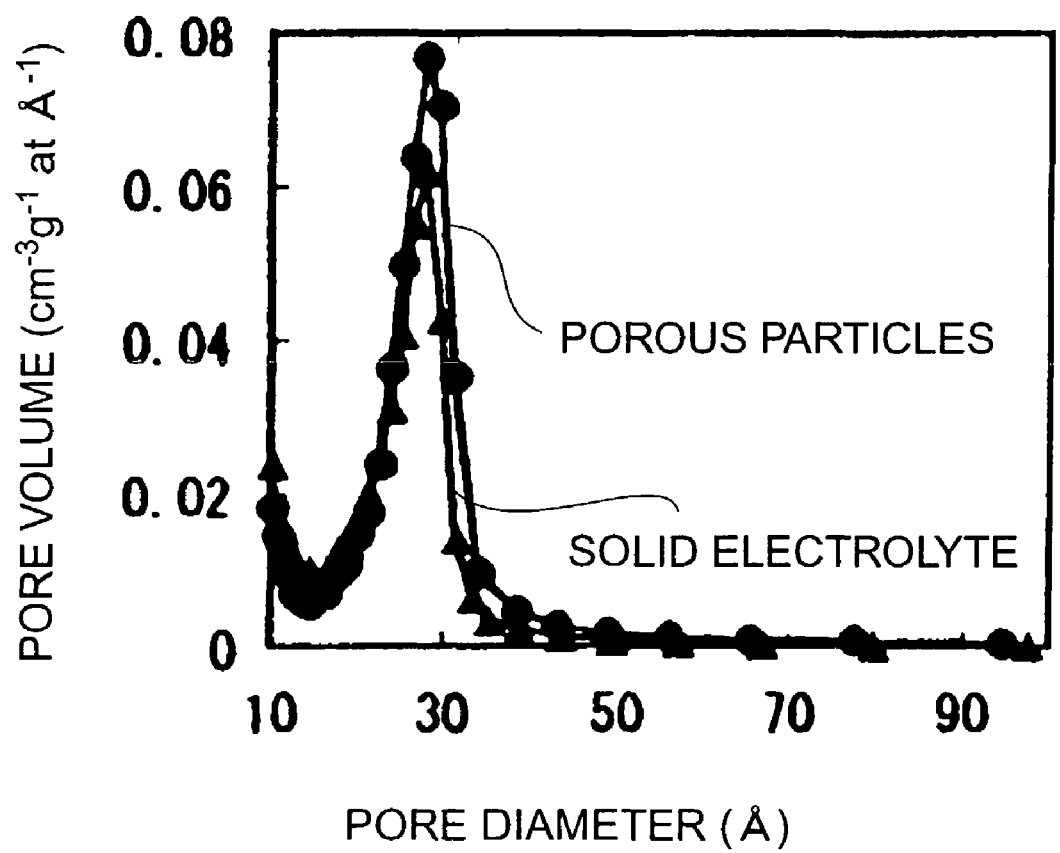
FIG. 9 is a graph depicting pore diameter distribution curves obtained for the porous particles and solid electrolyte of synthesis example 1.

For example, the above embodiments were described for a membrane electrode assembly having gas diffusion electrodes, but the membrane electrode assembly of the present invention is not limited thereby and may, for example, have a structure comprising an electrolyte membrane 30, a catalyst layer 11, and a catalyst layer 21, as in the membrane electrode assembly 1A shown in FIG. 5.

In addition, the above embodiments were described for a fuel cell having a single-cell structure, but the membrane electrode assembly of the present invention is not limited thereby and may have a so-called stacked structure with a plurality of layered cells.

Furthermore, the applications of the membrane electrode assembly of the present invention are not limited by the above-described embodiments and may, for example, include hydrogen halide electrolyzers, brine electrolyzers, hydrogen concentrators, humidity sensors, and gas sensors.

EXAMPLES

The present invention will now be described in further detail on the basis of examples and comparative examples, but the present invention is not limited in any way by the examples that follow.

The following materials were first fabricated in the sequence described below: solid electrolytes pertaining to the present invention (synthesis examples 1 to 4), a conventional polymer electrolyte (comparative synthesis example 1), and porous particles (organic/inorganic composite material, comparative synthesis example 2) in which no sulfonic acid groups were introduced into the pores and which served as starting materials for the solid electrolytes pertaining to the present invention.

Synthesis Example 1

<Fabrication of Porous Particles>

16.665 g (47.88 mmol) of octadecyl trimethylammonium chloride ($C_{18}H_{37}N(CH_3)_3Cl$, referred to hereinbelow as "$C_{18}TMA$"), 500 g of deionized water, and 40 g of a 6N NaOH aqueous solution (NaOH content: 200 mmol) were introduced into a 1000-mL round-bottom flask and stirred at 50 to 60° C., yielding a transparent solution. This solution was cooled to room temperature, 20 g (49.67 mmol) of 1,4-bis(triethoxysilyl)benzene (referred to hereinbelow as "BTEB") was then added under vigorous stirring, and the flask was treated with ultrasound waves for 20 minutes while manually shaken to disperse the BTEB in the solution. The resulting reaction mixture was allowed to stand for 20 hours at 95 to 98° C., where upon a white precipitate formed. The reaction mixture was filtered without cooling, and the precipitate was recovered, yielding 8.22 g of a surfactant-containing porous particulate precursor.

One gram of the resulting porous particulate precursor was subsequently dispersed in 250 mL of a hydrochloric acid/ethanol mixed solution containing 36 wt % hydrochloric acid, and the system was stirred for 8 hours at 70° C. The precipitate was then recovered by filtration, and washing with 250 mL of anhydrous ethanol, air drying, and vacuum drying at room temperature and a pressure of $10^{-2}$ to $10^{-3}$ torr were sequentially performed, yielding the target porous particles.

The resulting porous particles were measured by $^{13}C$-NMR and $^{29}Si$-NMR, measured by X-ray diffraction, measured to determine the nitrogen adsorption isotherms, and observed under an electronic microscope. The resulting X-ray diffraction patterns, nitrogen adsorption isotherms, and pore diameter distribution curves are shown in FIGS. 6 and 7, FIG. 8, and FIG. 9, respectively. The X-ray diffraction patterns shown in FIG. 7 were obtained by varying the scale of the X-ray patterns shown in FIG. 6 in the range 2θ=1 to 10.

Based on the results of the above measurements, it was confirmed that the resulting porous particles had secondary hexagonal mesopores, that the backbone composition was —$C_6H_4$—$Si_2O_3$—, and that the surfactant had been completely removed. It was also learned that the mean pore diameter of the pores in the porous particles was 2.8 nm, the BET specific surface area was 850 m²/g, the pore volume was 0.63 cm³, and the thickness of the pore walls was 2.5 nm.

<Fabrication of Solid Electrolyte (Sulfonation)>

23 g of 50-mass % fuming sulfuric acid was added to 0.5 g of the aforementioned porous particles, and the system was stirred for 5 hours at 95 to 105° C. There action mixture was cooled to room temperature, ethanol was added, and excess fuming sulfuric acid was caused to decompose. The precipitate in the reaction mixture was recovered by filtration, washed with water, added to deionized water, and boiled for 1 hour. The product was further stirred overnight in 6N hydrochloric acid, and the precipitate obtained by filtration was vacuum-dried at room temperature and a pressure of $10^{-2}$ to $10^{-3}$ torr, yielding the target solid electrolyte.

Figure 10:
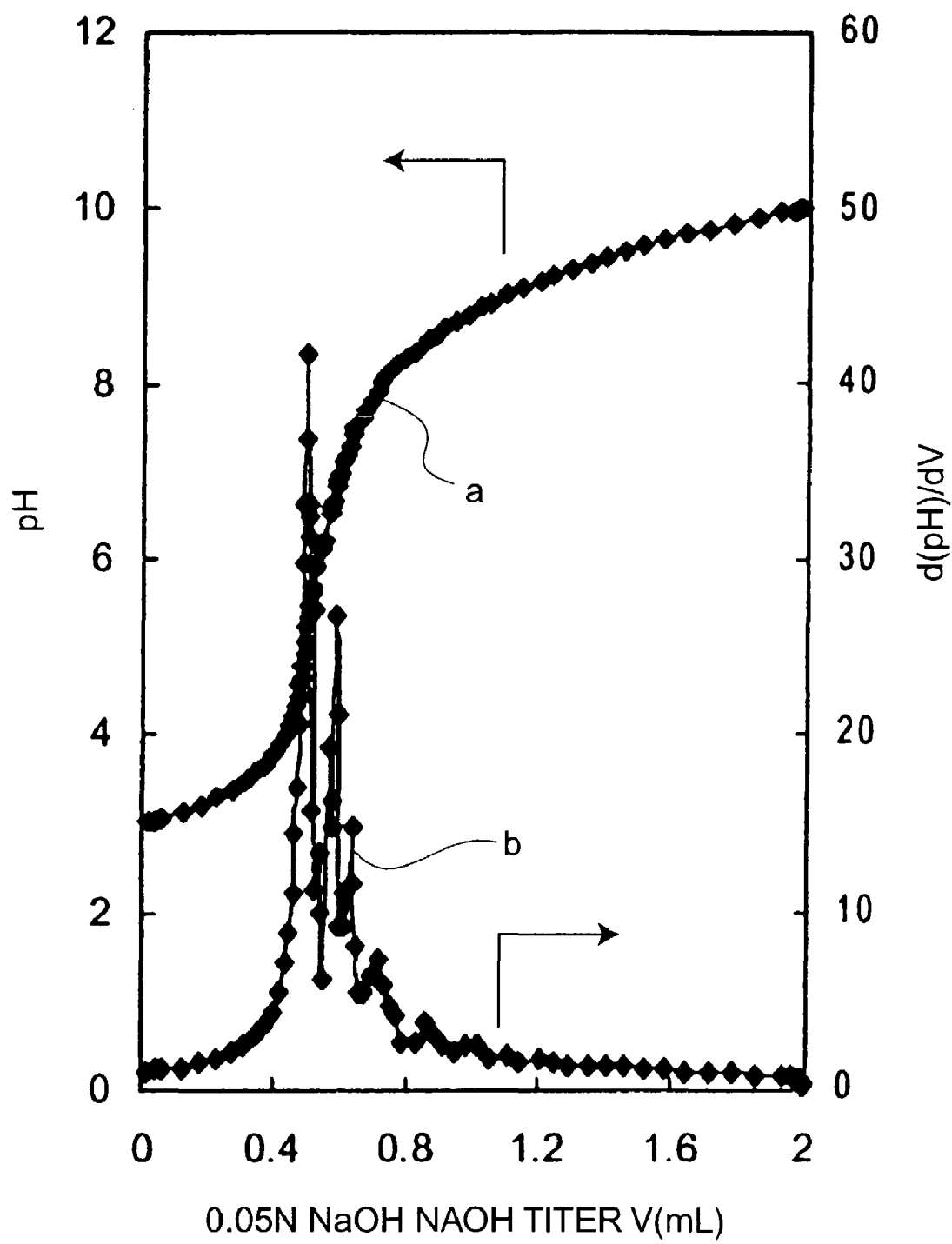
FIG. 10 is a sodium hydroxide titration curve obtained for the solid electrolyte of synthesis example 1, wherein a designates the correlation between the titer and the pH of a 0.05N sodium hydroxide aqueous solution, and b designates the correlation between the titer and the d(pH)/dV (value obtained by differentiating the pH with respect to the titer V) of a 0.05N sodium hydroxide aqueous solution.

The resulting solid electrolyte was subjected to sodium hydroxide titration in the following sequence. Specifically, 50 mg of solid electrolyte was thoroughly vacuum-dried at 70° C. and $10^{-2}$ to $10^{-3}$ torr, and immersed overnight in a 10-wt % sodium chloride aqueous solution. Titration was then performed using a 0.05N sodium hydroxide aqueous solution, and the hydrogen ion ($H^+$) equivalent was measured. The resulting titration curves are shown in FIG. 10. In FIG. 10, curve a indicates the correlation between the pH and the amount in which a 0.05N sodium hydroxide aqueous solution was dropped, and curve b indicates the correlation between d(pH)/dV (value obtained by differentiating the pH at a dropping amount V with respect to the V) and the amount in which the 0.05N sodium hydroxide aqueous solution was dropped. It was confirmed that $5.5 \times 10^{-4}$ eq/g of hydrogen ions was present in the resulting solid electrolyte, as shown in FIG. 10. This result indicated that 14.3% of the phenyl groups in the backbone (—$C_6H_4$—$Si_2O_3$—) of the porous body had been sulfonated to form a backbone expressed by —$O_{1.5}Si$—$C_6H_3(SO_3H)$—$SiO_{1.5}$—.

In addition, X-ray diffraction patterns and nitrogen adsorption isotherms were measured for the aforementioned solid electrolyte. The resulting X-ray diffraction patterns, nitrogen adsorption isotherms, and pore diameter distribution curves are shown in FIGS. 6 and 7, FIG. 8, and FIG. 9, respectively. Based on these results, it was confirmed that the mean pore diameter of the pores in the porous particles was 2.8 nm, the BET specific surface area was 760 m²/g, the pore volume was 0.50 cm³, the thickness of the pore walls was 2.5 nm, and a uniform mesoporous structure could be maintained even after the introduction of sulfonic acid groups into the pores. Three peaks, at 2θ=11.6, 23.5, and 35.5, were found in the X-ray diffraction patterns of the porous particles and solid electrolyte shown in FIG. 6, and these results suggest that the benzene rings constituting the backbone of the solid electrolyte (or porous particles) are contained in pore walls, and that a regular structure is present in the pore walls.

Synthesis Example 2

A solid electrolyte was fabricated and subjected to sodium hydroxide titration in the same manner as in synthesis example 1, except that 30 g of 60-mass % fuming sulfuric acid was used instead of the 23 g of 50-mass % fuming sulfuric acid used in synthesis example 1, and a reaction was conducted for 5.5 hours at 75 to 85° C. As a result, it was confirmed that $3.2 \times 10^{-4}$ eq/g of hydrogen ions was present in the resulting solid electrolyte. This result indicated that 8.3% of the phenyl groups in the backbone (—$C_6H_4$—$Si_2O_3$—) of the porous body had been sulfonated to form a backbone expressed by —$O_{1.5}Si$—$C_6H_3(SO_3H)$—$SiO_{1.5}$—.

Synthesis Example 3

A solid electrolyte was fabricated and subjected to sodium hydroxide titration in the same manner as in synthesis example 1, except that 30 g of sulfuric anhydride ($SO_3$) was used instead of the 23 g of 50-mass % fuming sulfuric acid used in synthesis example 1, and a reaction was conducted for 5.2 hour sat 40° C. As a result, it was confirmed that $1.1 \times 10^{-4}$ eq/g of hydrogen ions was present in the resulting solid electrolyte. This result indicated that 2.9% of the phenyl groups in the backbone (—$C_6H_4$—$Si_2O_3$—) of the porous body had been sulfonated to form a backbone expressed by —$O_{1.5}$Si—$C_6H_3(SO_3H)$—$SiO_{1.5}$—.

Synthesis Example 4

A solid electrolyte was fabricated and subjected to sodium hydroxide titration in the same manner as in synthesis example 1, except that 30 g of a 50 mass % sulfuric anhydride ($SO_3$)/tetrachloroethylene ($CHCl_2CHCl_2$) mixed solution was used instead of the 23 g of 50-mass % fuming sulfuric acid used in synthesis example 1, and a reaction was conducted for 5.5 hours at 50 to 60° C. As a result, it was confirmed that $1.2 \times 10^{-4}$ eq/g of hydrogen ions was present in the resulting solid electrolyte. This result indicated that 3.1% of the phenyl groups in the backbone (—$C_6H_4$—$Si_2O_3$—) of the porous body had been sulfonated to form a backbone expressed by —$O_{1.5}$Si—$C_6H_3(SO_3H)$—$SiO_{1.5}$—.

Comparative Synthesis Example 1

A polymer electrolyte membrane (registered trade name: Nafion 112; manufactured by DuPont) comprising perfluorosulfonic acid was used as comparative synthesis example 1 for the evaluation and testing of water vapor adsorption characteristics described below.

Comparative Synthesis Example 2

The porous particles obtained in synthesis example 1, in which no sulfonic acid groups had been introduced into the pores, were used as comparative synthesis example 2 for the evaluation and testing of water vapor adsorption characteristics described below.

[Evaluation and Testing of Water Vapor Adsorption Characteristics]

The amount in which water vapor was adsorbed when contact was maintained until water vapor whose relative pressure had been adjusted to a specific value reached saturation at 25° C. was measured for the solid electrolytes of synthesis example 1 and comparative synthesis example 1, and for the porous particles of comparative synthesis example 2. The water vapor adsorption isotherms obtained by this measurement are shown in FIG. 11.

Figure 11:
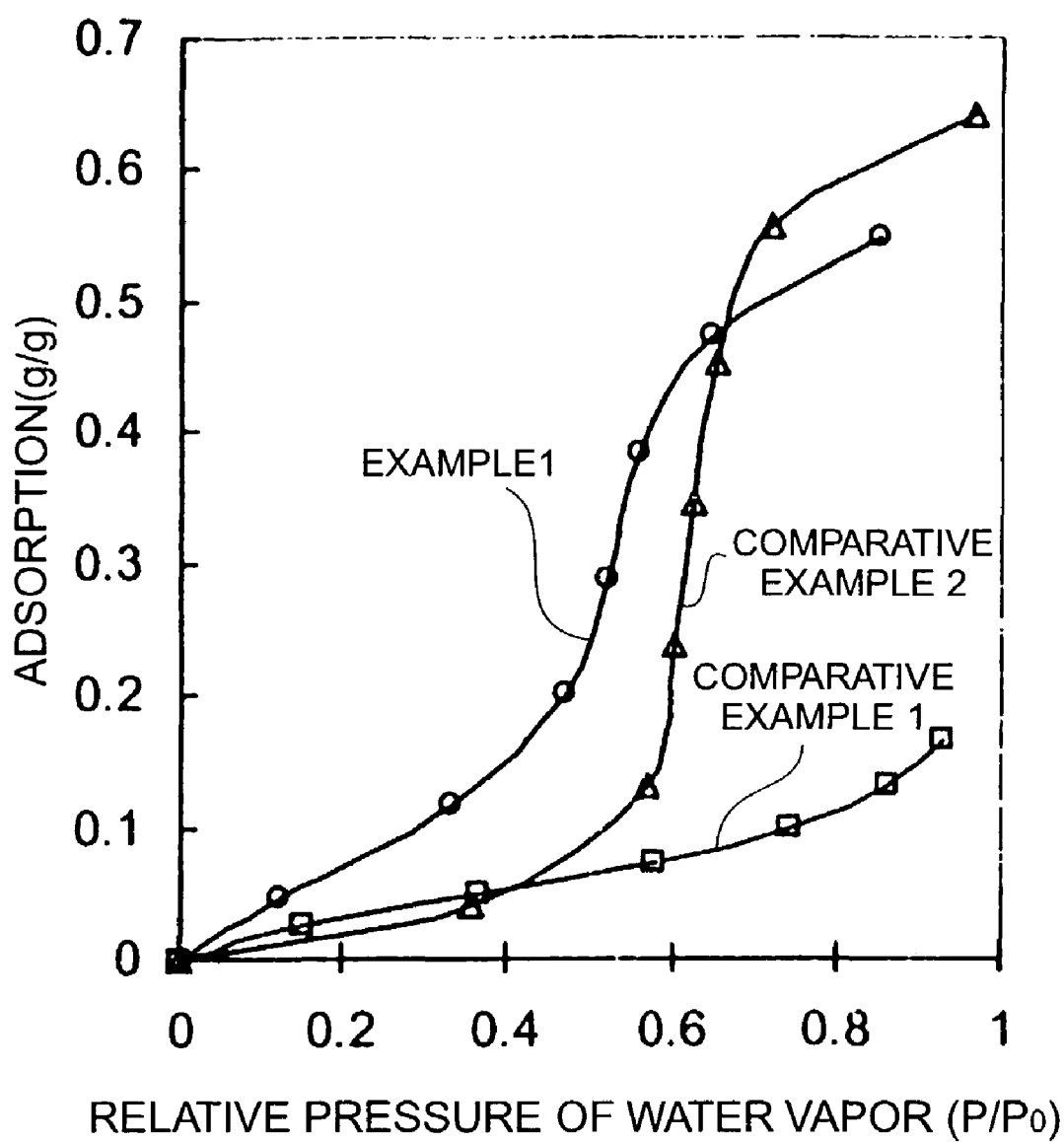
FIG. 11 is a graph depicting the water vapor adsorption isotherms at 25° C. obtained for the solid electrolytes of synthesis example 1 and comparative synthesis example 1, and the porous particles of comparative synthesis example 2.

It was confirmed for the solid electrolyte of Synthesis Example 1 that the quantity of water vapor adsorption increases dramatically when the relative pressure of water vapor exceeds 0.45, that 0.45 g of water vapor, which corresponds to 90% of the pore volume, is adsorbed when the relative pressure of water vapor is 0.6, and that the pores are completely filled with water even when the relative pressure of water vapor is less than 1.0, as shown in FIG. 11. It was also found in the case of the porous particles of comparative synthesis example 2 that the quantity of water vapor adsorption increased dramatically with an increase in the relative pressure of the water vapor, and this phenomenon manifested itself after the relative pressure of the water vapor exceeded 0.6. These results were ascribed to the effect of improved water vapor adsorption characteristics that resulted from the introduction of sulfonic acid groups into the pores.

By contrast, no findings were obtained concerning adequate adsorption of water vapor in the solid electrolyte of comparative synthesis example 1 even when the relative pressure of the water vapor exceeded 0.9, and it was confirmed that adequate ionic conductance could not be obtained when the relative pressure of the water vapor was less than 1.0.

[Evaluation and Testing of Heat Resistance]

Figure 12:
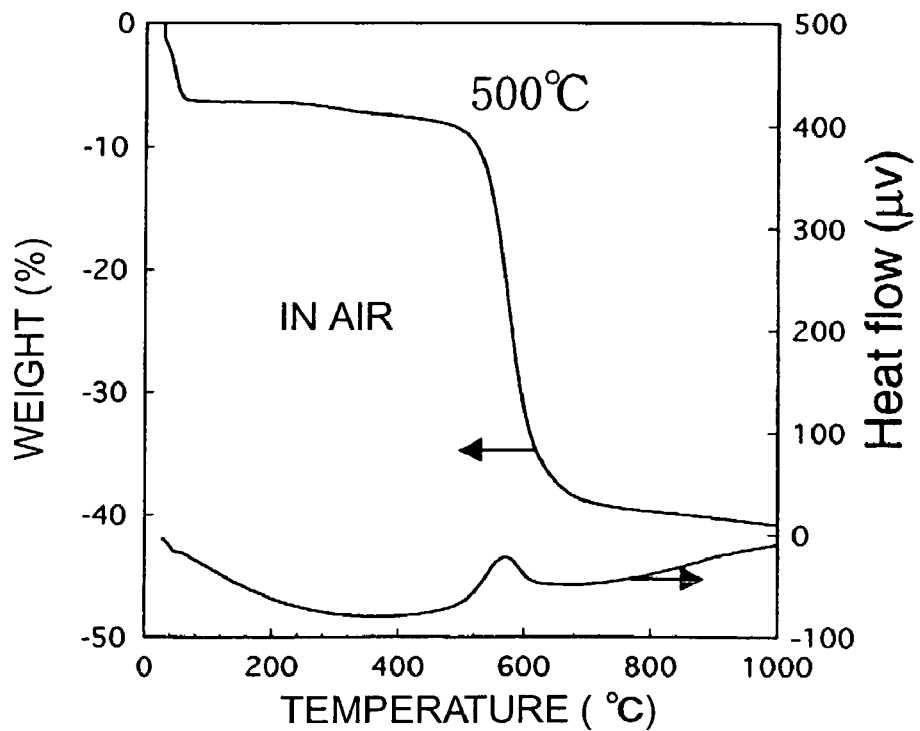
FIG. 12 is a graph depicting the profile of weight variations in porous particles as a starting material for the solid electrolyte of synthesis example 1 when a thermogravimetric analysis was performed in an air stream.

The solid electrolyte of synthesis example 1 and unsulfonated porous particles, which are a starting material for the solid electrolyte of synthesis example 1, were thermogravimetrically analyzed and evaluated for their heat resistance in an air stream and a nitrogen stream. FIG. 12 depicts the profile of weight variations in porous particles as a starting material for the solid electrolyte of synthesis example 1 when the thermogravimetric analysis was performed in an air stream. In addition, FIG. 13 depicts the profile of porous particles as a starting material for the solid electrolyte of synthesis example 1 when thermogravimetric analysis was performed in a nitrogen stream.

Figure 13:
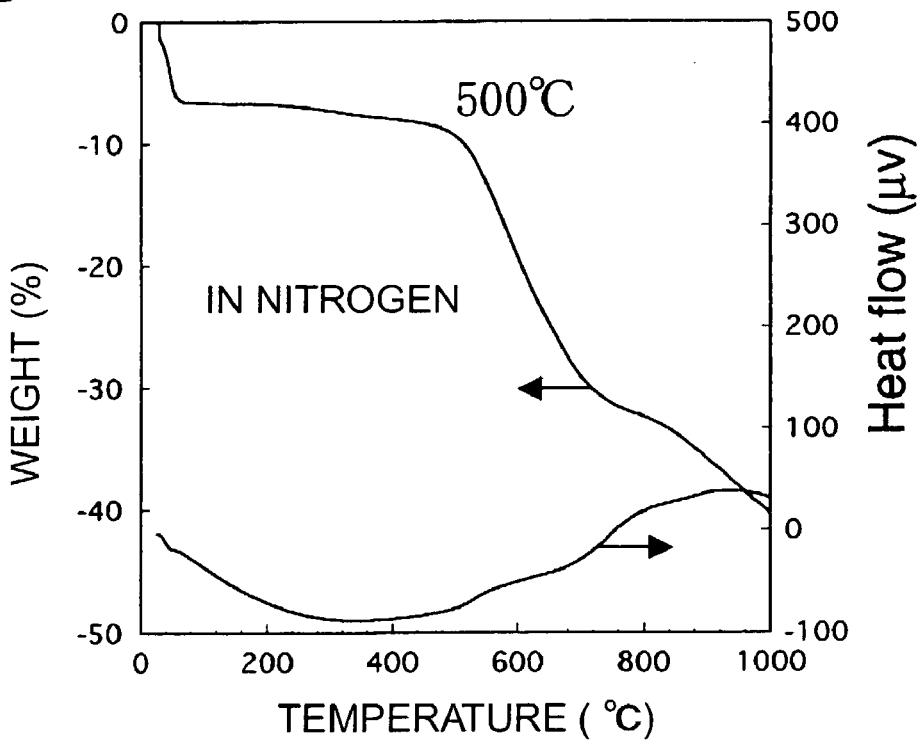
FIG. 13 is a graph depicting the profile of weight variations in porous particles as a starting material for the solid electrolyte of synthesis example 1 when a thermogravimetric analysis was performed in a nitrogen stream.

As can be seen from the results shown in FIGS. 12 and 13, a significant weight loss of porous particles that accompanied the decomposition or sintering of the organic matter in the pores was observed at a temperature of about 500° C. or greater both in the air stream and in the nitrogen stream. Based on this fact, it was confirmed that benzene rings were stably retained in the pores of the porous particles and that the porous particles exhibited high heat resistance within a temperature region of about 500° C. or less.

It was also confirmed that the three peaks in the narrow-angle region ($2\theta < 10$) and the four peaks in the wide-angle region ($10 < 2\theta < 70$), which had been observed in the previously described X-ray diffraction patterns for such porous particles, were observed within the temperature region of 500° C. or less. Based on this fact, it was confirmed that both the structure in which the mesopores of porous particles were arranged in an orderly fashion, and the ordered structure present on the atomic scale in the pore walls could be maintained in the temperature region of 500° C. or less. It was also confirmed that the three peaks in the narrow-angle region ($2\theta < 10$) were observed following baking within a temperature region of 500 to 900° C. both in an air stream and in a nitrogen stream, and that the structure in which mesopores were arranged in an orderly fashion was observed even after the organic matter in the pores had decomposed.

In addition, unsulfonated porous particles, which are a starting material for the solid electrolyte of synthesis example 1, were heated for 8 hours in boiling water, and it was confirmed that no changes at all had occurred affecting the backbone structure with pores or the condition of the organic groups in the pores following such heating. These porous particle were thus confirmed to have high hydrothermal stability. These results also suggest that the solid electrolyte of synthesis example 1 has high hydrothermal stability.

Results related to a profile in which weight variations had the same tendency as the above-described porous particle were also yielded by a thermogravimetric analysis of the solid electrolyte of synthesis example 1 both in an air stream and in a nitrogen stream, and it was confirmed that benzene rings and sulfonic acid groups (—$SO_3H$) could be stably retained in the pores of the solid electrolyte at a temperature of about 500° C. or greater and that the solid electrolyte exhibited high heat resistance. Based on the analysis results of X-ray diffraction patterns, it was also confirmed that both the structure in which the mesopores of the solid electrolyte of synthesis example 1 were arranged in an orderly fashion, and the ordered structure on the atomic scale in the pore walls could be maintained within the temperature region of 500° C. or less both in an air stream and in a nitrogen stream.

Desorption gas was also subjected to mass spectrometry during a thermogravimetric analysis involving the solid electrolyte of synthesis example 1, and it was confirmed that the sulfonic acid groups (—$SO_3H$) introduced into the pores of the solid electrolyte could be stably retained within the temperature region of 500° C. or less both in an air stream and in a nitrogen stream.

[Structural Analysis]

Unsulfonated porous particles, which served as a starting material for the solid electrolyte of synthesis example 1, were photographed using a transmission electron microscope (TEM) and measured using electron beam diffraction patterns, and the structure of the porous particles was analyzed, and the structure of the solid electrolyte of synthesis example 1 deduced based on the results thus obtained.

Figure 14:
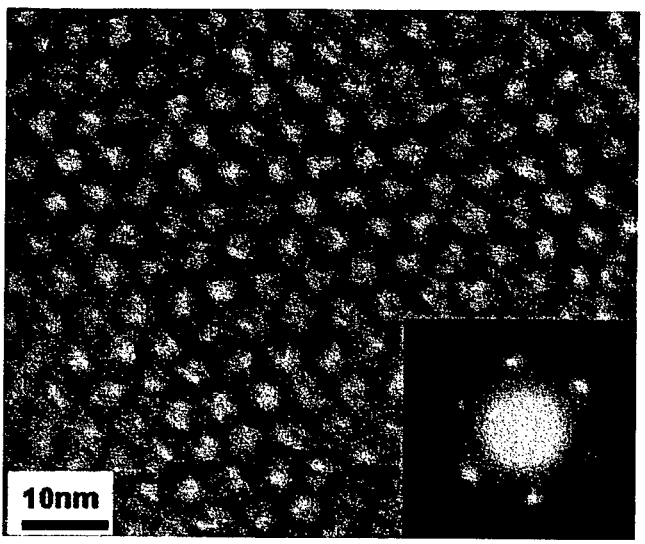
FIG. 14 is a TEM photograph of porous particles as a starting material for the solid electrolyte of synthesis example 1.
Figure 15:
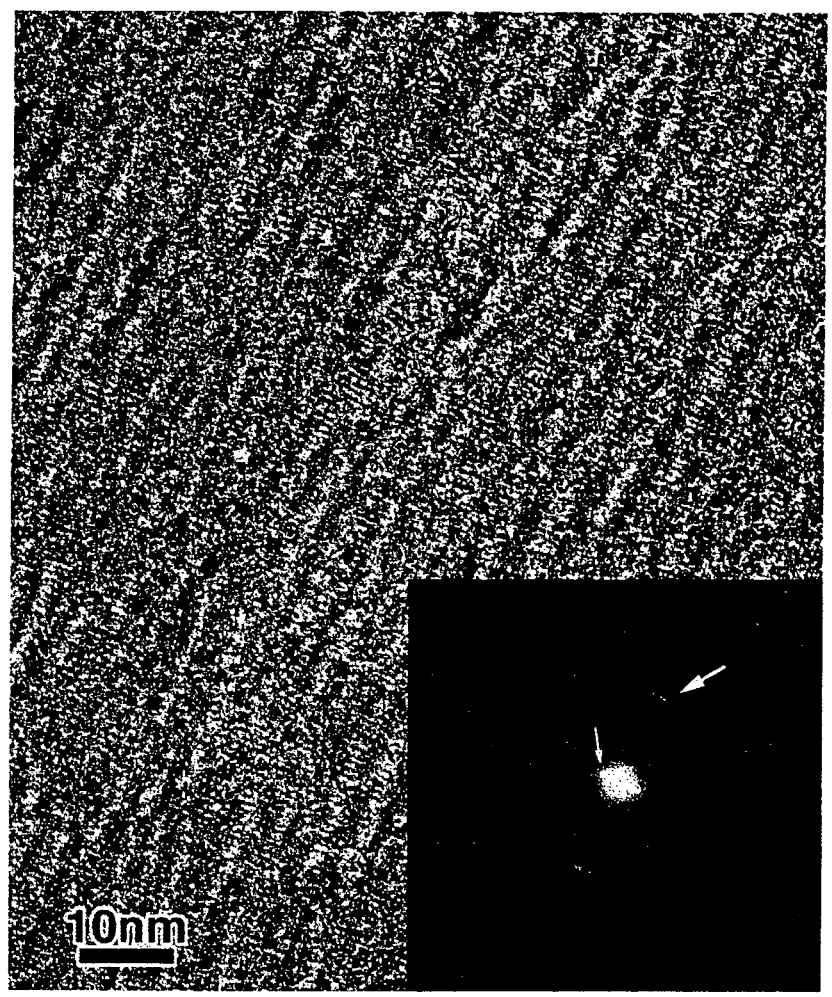
FIG. 15 is a TEM photograph of porous particles as a starting material for the solid electrolyte of synthesis example 1.

FIGS. 14 and 15 are TEM photographs of porous particles that served as a starting material for the solid electrolyte of synthesis example 1. FIG. 14 depicts a TEM photograph obtained when an observation was made concerning the cross sections of hexagonally arranged mesopores in porous particles, and FIG. 15 depicts a TEM photograph obtained when the mesopores of the porous particles were viewed in the lateral direction (direction perpendicular to the normal direction to the cross section of the mesopores shown in FIG. 14).

Based on the TEM photographs in FIGS. 14 and 15, it was confirmed that the porous particles were configured such that tunnel-like mesopores were arranged in a hexagonal manner. It was also learned from the TEM photograph in FIG. 15 that a layered structure with an interlayer distance of 7.6 Å (see FIG. 16 below) extended throughout the entire pore wall.

In addition, the internal structure of the porous particles found on the TEM photographs in FIGS. 14 and 15 was in agreement with the internal structure of porous particles determined based on the measurement results of electron beam diffraction patterns. It was also confirmed on the basis of these results that these porous particles had a surface structure in which layers of hydrophobic benzene rings and layers of hydrophilic silicates were arranged in an alternating manner. It was further learned from these results that the porous particles had the internal structure schematically shown in FIG. 16.

Furthermore, the arrangement structure of benzene rings and silicates inside the pore walls of porous particles was determined based on the aforementioned information. The results are shown in FIGS. 17 to 21. The structural models shown in FIGS. 17 to 21 below were created using "Cerius$^2$" (UNIX machine software) on the basis of analysis data obtained from XRD, TEM, $^{29}$Si-NMR, and $^{13}$C-NMR (, and a publication (G. Cerroan et al., *Angew. Chem. Int. Edu. Engl.*, Vol. 39, pp. 1376 to 1398, 2000) related the monocrystalline structural analysis of 1,4-bis(trihydroxysilyl)benzene molecules.

Figure 16:
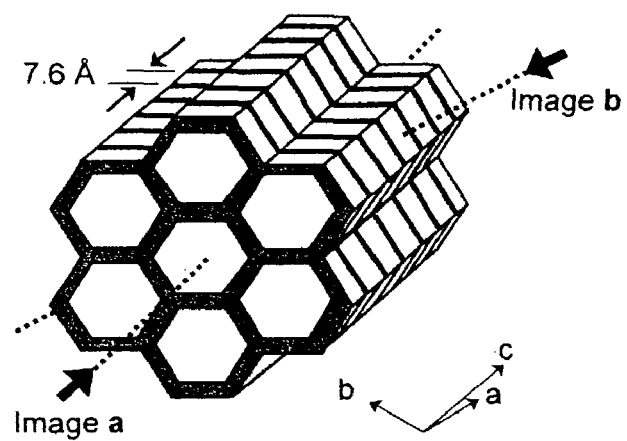
FIG. 16 is a perspective view schematically depicting the internal structure of porous particles as a starting material for the solid electrolyte of synthesis example 1.
Figure 17:
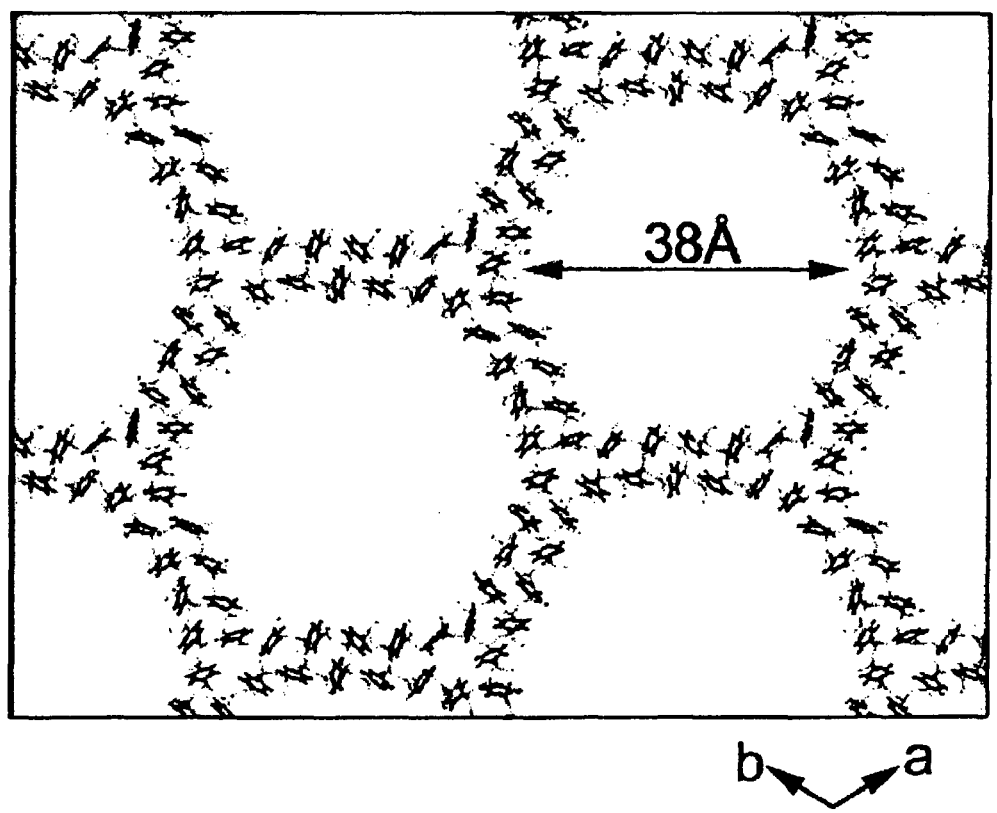
FIG. 17 is a model diagram schematically depicting the hexagonal structure of mesopores in the porous particles as viewed along the c-axis shown in FIG. 16.
Figure 18:
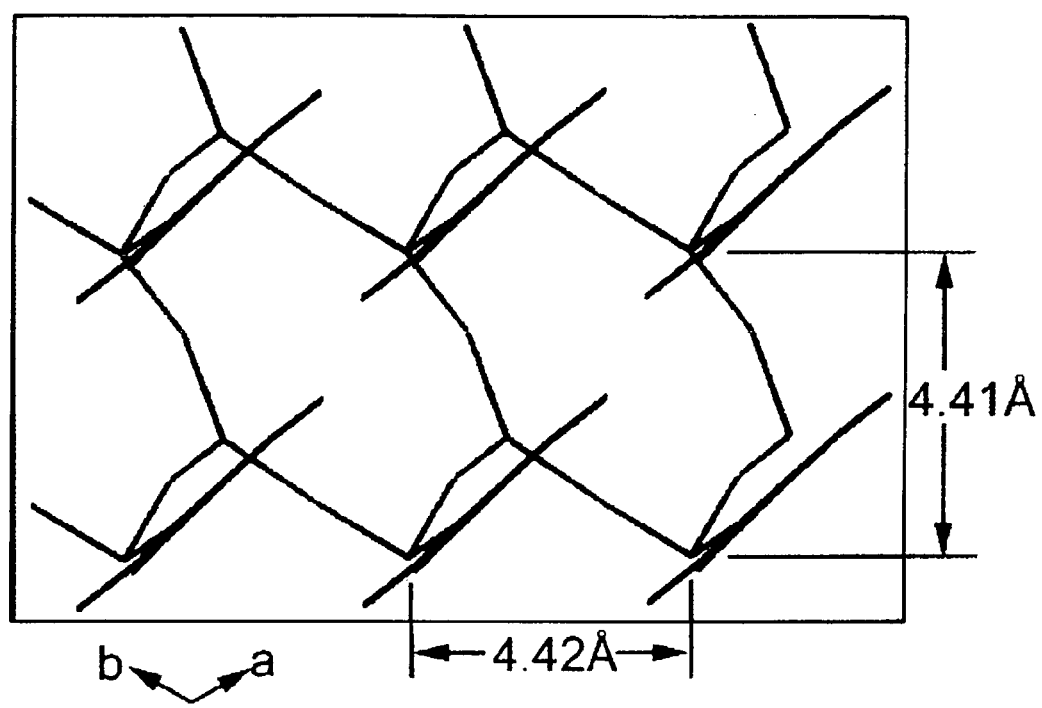
FIG. 18 is an enlarged view of FIG. 17.

FIG. 17 is a model diagram schematically depicting the hexagonal structure of mesopores in the porous particles as viewed along the c-axis shown in FIG. 16. In addition, FIG. 18 is an enlarged view of FIG. 17. FIGS. 17 and 18 are diagrams indicating that the units (backbones) whose composition is expressed as —$O_{1.5}Si$—$C_6H_3$—$SiO1_{0.4}$— in the pore walls of porous particles are formed in a layered fashion.

Figure 19:
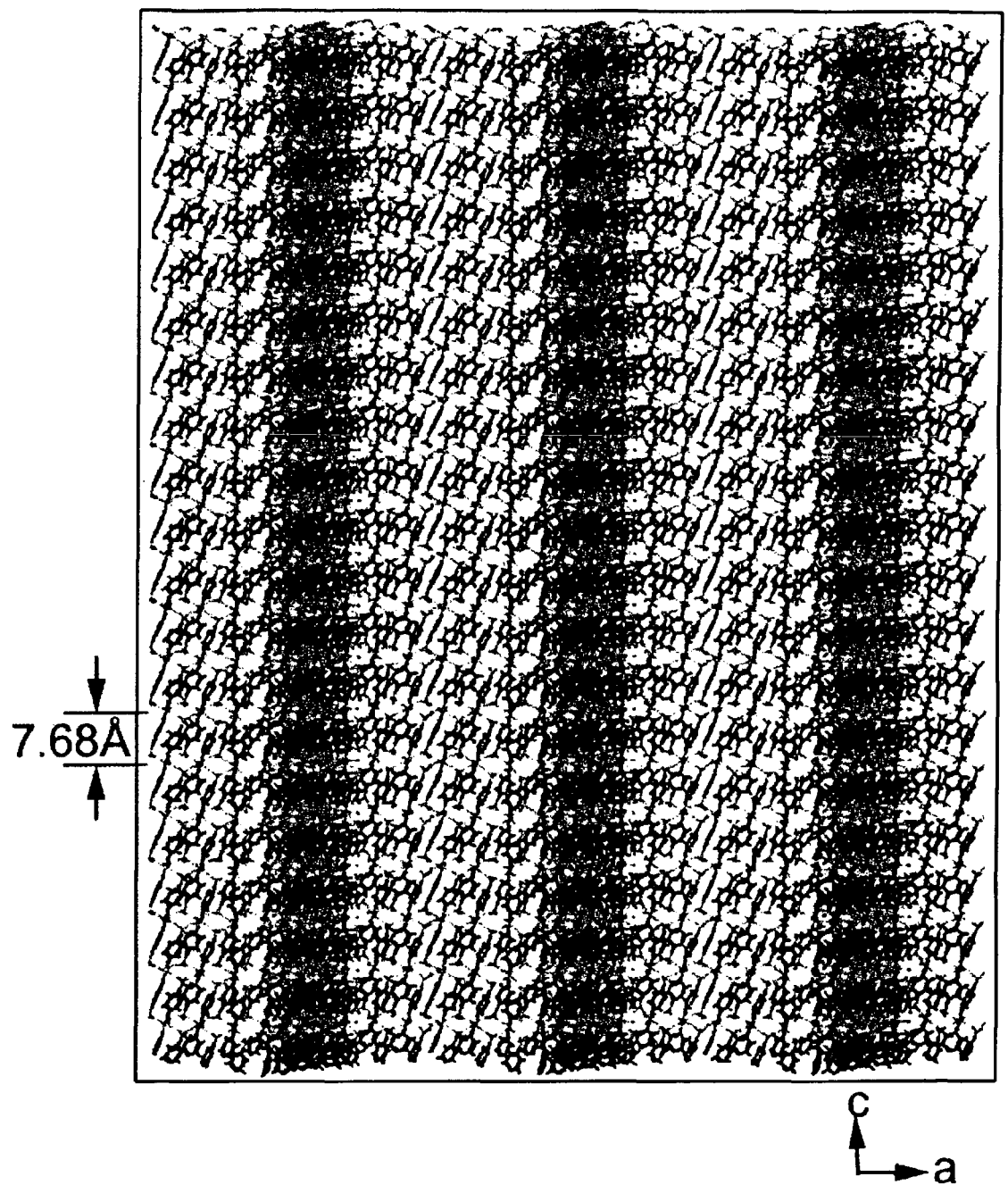
FIG. 19 is a model diagram schematically depicting the hexagonal structure of mesopores in the porous particles as viewed along the b-axis shown in FIG. 16.
Figure 20:
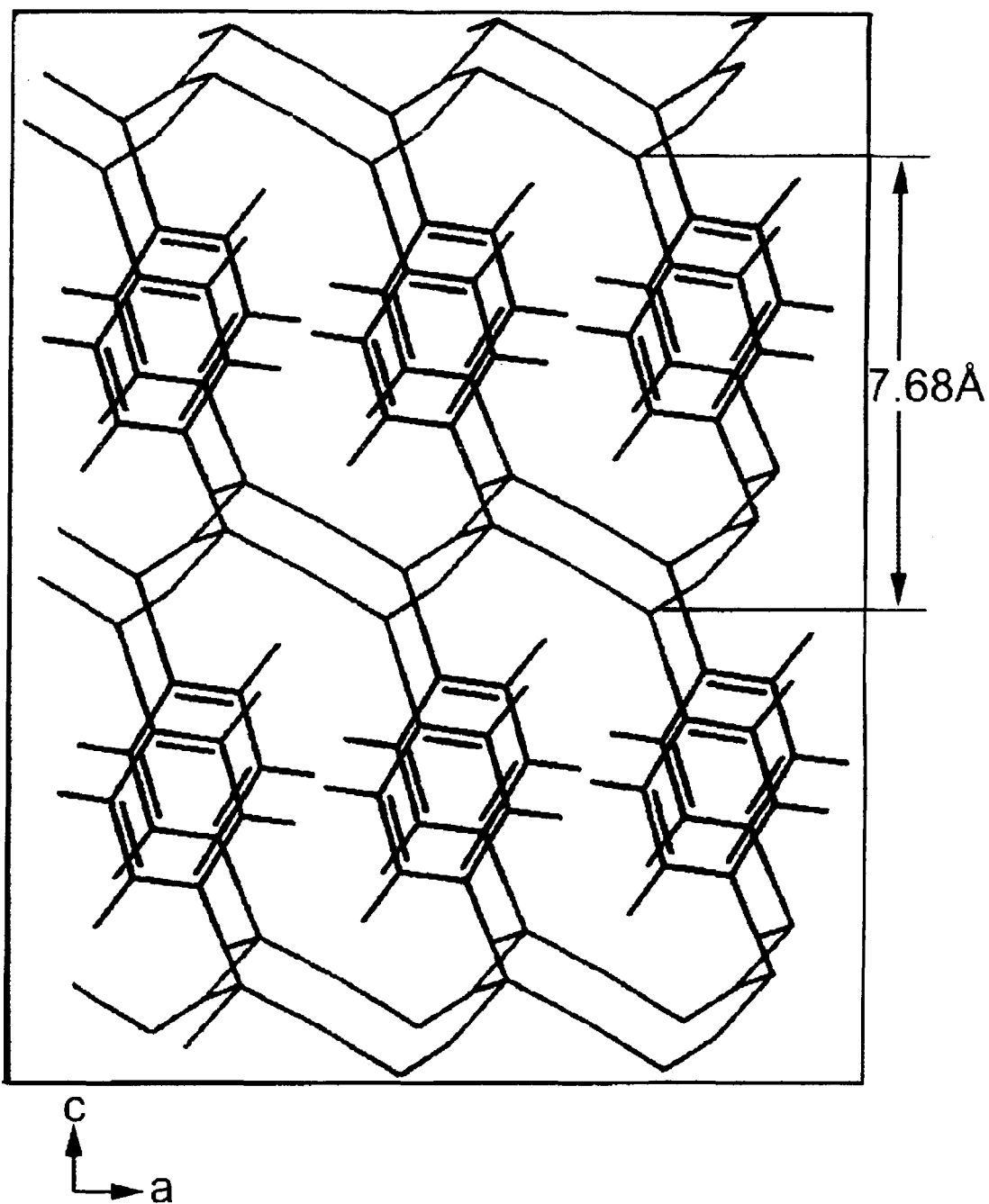
FIG. 20 is an enlarged view of FIG. 19.
Figure 21:
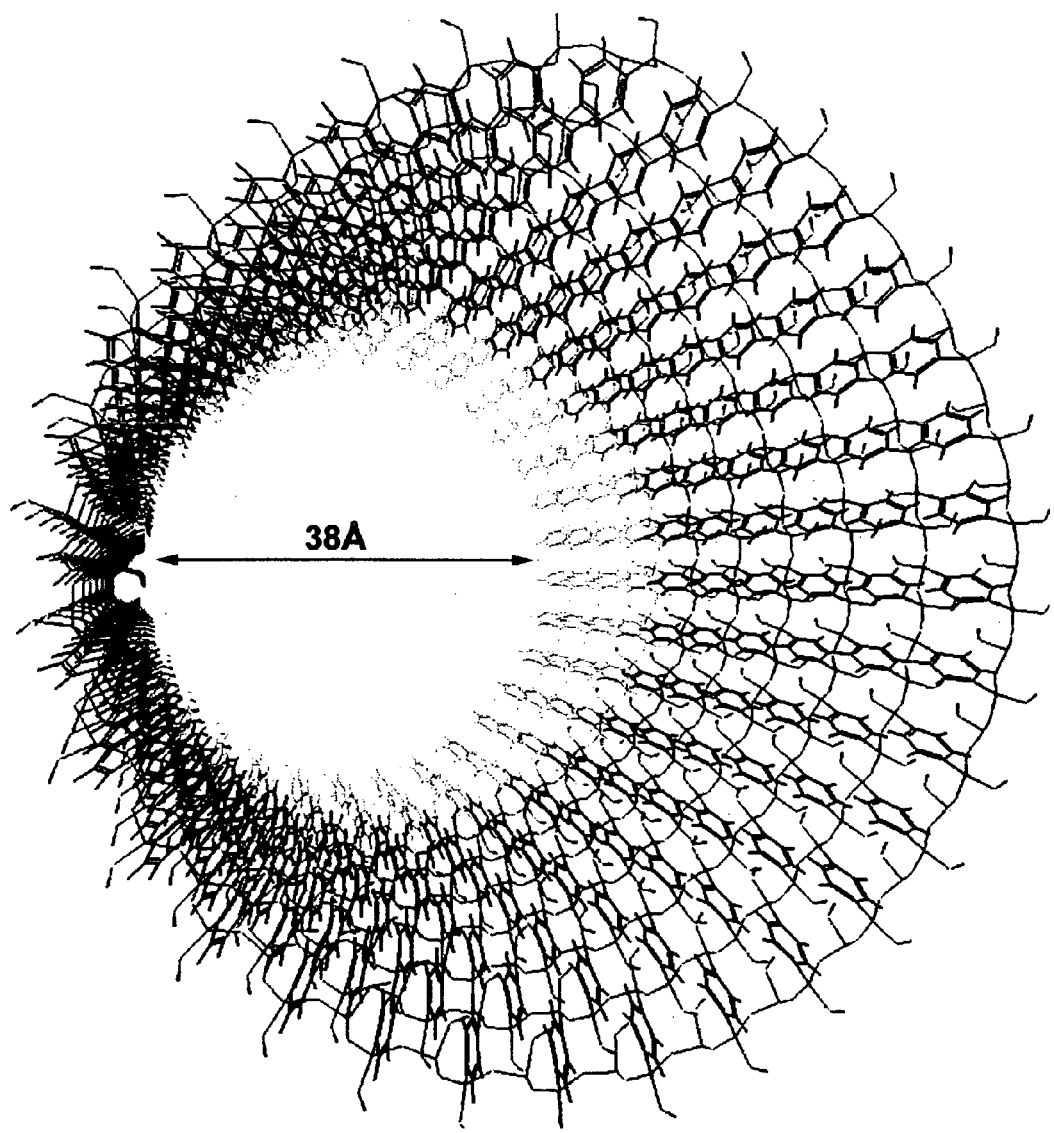
FIG. 21 is a model diagram schematically depicting the molecule structure inside the mesopores of the porous particles.

FIG. 19 is a model diagram schematically depicting the hexagonal structure of mesopores in the porous particles as viewed along the b-axis shown in FIG. 16. In addition, FIG. 20 is an enlarged view of FIG. 19. Furthermore, FIG. 21 is a model diagram schematically depicting the molecule structure inside the mesopores of the porous particles.

Solid electrolytes (synthesis examples 5 to 8) pertaining to the present invention were subsequently fabricated in the following sequence, as was a solid electrolyte (comparative synthesis example 3) obtained by a process in which porous particles that served as a starting material for the solid electrolyte of synthesis example 1 and did not have any sulfonic acid groups introduced into the pores were dispersed in a conventional polymer electrolyte; and the specific conductance of each electrolyte was measured.

Synthesis Examples 5 to 8

The solid electrolyte of synthesis example 1 was mixed in a specific mixing ratio with an ethanol solution (perfluorosulfonic acid content: 5%) of perfluorosulfonic acid (Nafion from DuPont) and made into a paste. The product was dried and molded in a tabletting apparatus at a pressure of 1100 kg/cm$^2$, yielding pellets with a diameter of 10 mm. In the process, the pellets of synthesis examples 5 to 8 were fabricated such that the content ratio of the solid electrolyte ([admixed amount of solid electrolyte]/[sum of admixed amounts of solid electrolyte and perfluorosulfonic acid]) was 0.60, 0.80, 0.89, and 0.91 in terms of mass.

Comparative Synthesis Example 3

Porous particles were fabricated in the same manner as in synthesis example 1, and pellets (content ratio of porous particles (in terms of weight): 0.60) were fabricated in the same manner as in synthesis example 5, except that the particles were directly mixed with a persulfonic acid/ethanol solution without being fashioned into a solid electrolyte (sulfonated).

[Measurement and Testing of Specific Conductance]

Each of the products obtained in synthesis examples 5 to 8 and comparative synthesis example 3 was sandwiched between two perfluorosulfonic acid membranes (Nafion 112 from DuPont), the assembly was mounted in a conductivity measuring cell (with discoid platinum black plating obtained by coating with a perfluorosulfonic acid (Nafion) solution; electrode diameter: 10 mm), and the electrodes were pressed down with a pressure of 32 kg/cm$^2$. The specific conductance of synthesis examples 5 to 8 and comparative synthesis example 3 was determined by immersing the cell in purified water and measuring the alternating-current resistance at 1 kHz with an LCR meter. The results are shown in Table 1.

TABLE 1

|  | CONTENT RATIO OF SOLID ELECTROLYTE | SPECIFIC CONDUCTANCE /S · cm$^{-1}$ |
| --- | --- | --- |
| SYNTHESIS EXAMPLE 5 | 0.60 | 0.021 |
| SYNTHESIS EXAMPLE 6 | 0.80 | 0.017 |
| SYNTHESIS EXAMPLE 7 | 0.89 | 0.017 |
| SYNTHESIS EXAMPLE 8 | 0.91 | 0.015 |
| COMPARATIVE SYNTHESIS EXAMPLE 3 | (0.60)* | 0.0014 |

*INDICATES THE CONTENT RATIO OF POROUS PARTICLES

As is evident from the results shown in Table 1, the pellets of synthesis examples 5 to 8 attain a sufficiently high specific conductance, whereas the pellets of comparative synthesis example 3 have an extremely low specific conductance. These results suggest that sulfonic acid groups are effective for developing conductivity in a solid electrolyte. It was also concluded that the specific conductance of solid electrolyte particles as such was even higher than the measured values shown in Table 1 because numerous cracks and flaws had formed in the pellets of synthesis examples 5 to 8 following measurement.

Example 1

A membrane electrode assembly having the same structure as in FIG. 1 was fabricated in accordance with the sequence described below.

An electrolyte membrane (membrane thickness: 20 μm) was fabricated in accordance with the following sequence. Specifically, a solution (referred to hereinbelow as "solution A") in which 5 mmol of 1,4-bis(trimethoxysilyl)benzene was completely dissolved in 31 mmol methanol was prepared. A solution (referred to hereinbelow as "solution B") was also prepared by a method whereby 2 mmol of octadecyl trimethylammonium chloride was completely dissolved in 220 mmol of water by being heated to 50 to 60° C., the dissolution product was cooled to room temperature, and 20 μL of a 2-mol/L hydrochloric acid aqueous solution was then added.

When solution A was gradually added to solution B and the product was vigorously stirred using a stirrer, clouding was observed immediately after the start of stirring, but this gradually changed to a transparent solution. This solution was applied by dipping to a polyethylene substrate. The substrate with the coated film was immersed in 50-mass % fuming sulfuric acid and heated for 5 hours to 95 to 105° C. The system was cooled to room temperature, and ethanol was then added to decompose any excess fuming sulfuric acid. The substrate with the coated film was subsequently taken out, thoroughly washed with water, and boiled for 1 hour in deionized water. The substrate was further dried after being allowed to stand overnight in 6-mol/L hydrochloric acid. An electrolyte membrane with a thickness of 20 μm was ultimately obtained by slowly peeling off the coated film from the substrate.

A paste for forming catalyst layers was prepared in the following manner, both for the anode and for the cathode. Specifically, a solution was prepared as a paste for forming catalyst layers in a manner such that carbon microparticles that carried 60 mass % of platinum, and an alcohol aqueous solution (perfluorosulfonic acid content: 5%) of a perfluorosulfonic acid polymer (registered trade name: Nafion; manufactured by DuPont) were adjusted to a mass ratio of 1:8.

Products with a thickness of 300 μm, obtained by covering the meshes of a water-repellent carbon cloth (woven fiber cloth) with a water-repellent carbon powder layer (mixture of carbon black and PTFE), were used herein as the gas diffusion layers of both the anode and cathode.

The anode and cathode catalyst layers were fabricated by applying and drying the paste for forming catalyst layers such that the amount in which platinum was supported on each of the two sides of the solid electrolyte membrane was 0.4 mg/cm$^2$.

The gas diffusion layers and the electrolyte membrane provided with the catalyst layers were bonded together in the below-described manner, and a membrane electrode assembly (effective surface area of electrodes: 1 cm$^2$) was fabricated. Specifically, the components were hot-pressed and bonded in a state in which the two gas diffusion layers were placed opposite each other such that the two sides on which the water-repellent carbon powder had been formed faced inward, and the electrolyte membrane provided with the catalyst layers was sandwiched therebetween.

Example 2

A membrane electrode assembly was fabricated in the same manner as in example 1, except that platinum and carbon were concurrently deposited by sputtering on the two sides of the electrolyte membrane used in example 1, and that catalyst layers (thickness: 1 μm; amount of supported platinum: 0.4 mg/cm$^2$) were formed extending from the outermost surface of the electrolyte membrane to the surface layer portions of the pores.

Example 3

A membrane electrode assembly was fabricated in the same manner as in example 1, except for the use of a solid electrolyte membrane fabricated in accordance with the sequence described below.

Specifically, an electrolyte membrane containing a solid electrolyte was obtained by using the same solid electrolyte as that used for the material that constituted the electrolyte membrane of example b 1, mixing this solid electrolyte and an alcohol aqueous solution (perfluorosulfonic acid content: 5%) of a perfluorosulfonic acid polymer (registered trade name: Nafion; manufactured by DuPont), and casting the mixture to form a membrane. The mixing ratio of the solid electrolyte and perfluorosulfonic acid solution was set such that the mass of solid electrolyte and perfluorosulfonic acid polymer was 2:8 when expressed as the mass ratio of dried solid fractions.

Example 4

A membrane electrode assembly was fabricated in the same manner as in example 1, except that a solid electrolyte membrane fabricated in accordance with the below-described sequence was used and that catalyst layers were further formed on this membrane in accordance with the following sequence.

Specifically, an alumina membrane filter (thickness: 20 μm; through-hole diameter: 0.1 μm; surface ratio of holes: 75%) was used as the support element, the same electrolyte membrane as the one used in example 1 was formed in each hole, and catalyst layers that were identical to those in example 2 and comprised platinum and carbon were formed by sputtering on the surface of the membrane.

Comparative Example 1

A membrane electrode assembly was fabricated in the same manner as in example 1, except that a polymer electrolyte membrane (registered trade name: Nafion111; membrane thickness: 25 μm; manufactured by DuPont) with a membrane thickness of 25 μm was used.

Comparative Example 2

A membrane electrode assembly was fabricated in the same manner as in example 2, except that a polymer electrolyte membrane (registered trade name: Nafion111; membrane thickness: 25 μm; manufactured by DuPont) was used.

[Evaluation and Testing of Electric Cell Characteristics]

A separator with gas channels was mounted on the membrane electrode assemblies of examples 1 to 4 and comparative examples 1 and 2 to fabricate measurement cells (fuel cells) having the same structure as the one shown in FIG. 2, and the current-voltage characteristics of each measurement cell were tested using an electron load and a direct-current power supply (manufactured by Hokuto Denko; registered trade name: ±2V20A Discharge Power Supply).

The measurement conditions of example 1, example 3, and comparative example 1 were nonhumidification conditions in which the hydrogen and air introduced into each measurement cell were not humidified, and in which the hydrogen pressure was 0.2 MPa (gage pressure), the air pressure was 0.2 MPa (gage pressure), the operating temperature of the measurement cells was 100° C., and the output current density was 0.5 A/cm$^2$. In addition, the measurement conditions of example 2, example 4, and comparative example 2 were the same as the aforementioned measurement conditions, except that the operating temperature of the measurement cells was 120° C.

Operation was started under the aforementioned measurement conditions, and the voltage (voltage between the terminals, including the ohmic loss) of each measurement cell was measured after 30 minutes had elapsed.

As a result of measurements, the voltage of the measurement cell in example 1 was 0.72 V, and stable power generation was possible. In addition, the voltage of the measurement cell in example 2 was 0.62 V, and stable power generation was possible. Furthermore, the voltage of the measurement cell in example 3 was 0.48 V, and stable power generation was possible. In addition, the voltage of the measurement cell in example 4 was 0.40 V, and stable power generation was possible. By contrast, the membranes in the measurement cells of comparative examples 1 and 2 rapidly dried up, the membrane resistance increased, and power generation could not be sustained.

With the membrane electrode assembly of the present invention, the product water of cell reactions can be efficiently used to humidify the electrolyte membrane, and high output can be obtained in a stable manner even when the quantity of water fed to the electrolyte membrane from the outside is reduced or blocked off altogether. Specifically, high output can be obtained in a stable manner even when the partial pressure of water vapor in at least either the reaction gas fed to the anode and/or the reaction gas fed to the cathode falls below the pressure of saturated water vapor at the operating temperature of the membrane electrode assembly.

In addition, the fuel cell of the present invention comprises the aforementioned membrane electrode assembly, and it is therefore possible to readily reduce the scale of the entire power generation system and to obtain high energy conversion efficiency.

Furthermore, the electrolytic cell of the present invention comprises the aforementioned membrane electrode assembly, and it is therefore possible to readily reduce the scale of the entire power generation system and to obtain high electrolysis conversion efficiency.

According to the present invention, it is also possible to provide a solid electrolyte that can be appropriately used as a material for the electrolyte membrane of the above-described membrane electrode assembly, fuel cell, and electrolytic cell of the present invention.

What is claimed is:

1. A membrane electrode assembly comprising an anode, a cathode, and an electrolyte membrane disposed between the anode and cathode,
wherein the electrolyte membrane comprises a solid electrolyte having a plurality of pores with a mean pore diameter ranging from 1 to 5 nm; and
the solid electrolyte is porous and formed from a polymer having an inorganic backbone in which an organic group having one or more carbon atoms and at least one functional group selected from the group consisting of a sulfonic acid group, a phosphoric acid group, and a carboxylic acid group, bonded to the metal atoms or oxygen atoms in the inorganic backbone, wherein the inorganic backbone has metal atoms and oxygen atoms bonded to metal atoms and which consists of inorganic elements, and which is obtained by the polycondensation of at least one compound of formula (7) as follows:

$$R\text{—}Si(OR')_3 \quad (7)$$

wherein R is an $C_{1\text{-}6}$-alkyl group, or an $C_{6\text{-}12}$-aryl group; and R' is methyl or ethyl,
wherein the interior surfaces of a plurality of pores of the solid electrolyte have ion exchange functional groups bonded to the organic groups of the polymer, and
wherein the pores comprise liquid water.

2. The membrane electrode assembly according to claim 1, wherein the anode and cathode are gas diffusion electrodes.

3. The membrane electrode assembly according to claim 1, wherein the electrolyte membrane further comprises a polymer electrolyte different from the solid electrolyte.

4. The membrane electrode assembly according to claim 1, wherein the numerical density of pores in an arbitrary plane parallel to the plane in contact with the anode of the electrolyte membrane is $1\times10^{11}$ pores/cm$^2$ or greater.

5. The membrane electrode assembly according to claim 1, wherein the electrolyte membrane comprises:
a support element that is shaped as a plate and has at least one communicating hole that penetrates all the way from the surface in contact with the anode to the surface in contact with the cathode; and
an ion-conducting element that comprises an electrolytic material packed into each of the at least one communicating holes; and
wherein the ion-conducting element comprises the solid electrolyte.

6. The membrane electrode assembly according to claim 5, wherein the ion-conducting element further comprises a polymer electrolyte different from the solid electrolyte.

7. The membrane electrode assembly according to claim 5, wherein the total cross-sectional surface area of all of the communicating holes in the ion-conducting element ranges from 0.2 to 30,000 nm$^2$.

8. The membrane electrode assembly according to claim 5, wherein the numerical density of the communicating holes in an arbitrary plane parallel to the plane in contact with the anode of the electrolyte membrane is $1\times10^9$ pores/cm$^2$ or greater.

9. The membrane electrode assembly according to claim 5, wherein the numerical density of pores in an arbitrary plane parallel to the plane in contact with the anode of the ion-conducting element is $1\times10^{11}$ pores/cm$^2$ or greater.

10. The membrane electrode assembly according to claim 1, wherein the solid electrolyte has one or more peaks at a diffraction angle that corresponds to a d-value of 1.5 nm or less in an X-ray diffraction pattern.

11. The membrane electrode assembly according to claim 2, wherein the gas diffusion electrodes comprise at least a catalyst layer that contains a catalyst for promoting electrode reactions at the anode and/or cathode, and has gas diffusion properties and electrical conductivity.

12. The membrane electrode assembly according to claim 11, wherein the gas diffusion electrodes further comprise a gas diffusion layer that has gas diffusion properties and electrical conductivity; and
the catalyst layer is disposed between the gas diffusion layer and the electrolyte membrane.

13. The membrane electrode assembly of claim 1, wherein the polymer of the solid electrolyte has sulfonic acid groups.

14. The membrane electrode assembly of claim 1, wherein the backbone of the polymer is bonded to benzene rings substituted with one or more of the functional groups.

15. The membrane electrode assembly of claim 14, wherein the functional group substituted benzene rings are present in the walls of the pores.

16. The membrane electrode assembly of claim 1, wherein the partial pressure of water vapor in the pores containing liquid water is less than the pressure of saturated water vapor at ambience temperature.

17. The membrane electrode assembly of claim 1, wherein at least a portion of the pores are completely filled with water.

18. A fuel cell, comprising:
- a membrane electrode assembly according to claim 1;
- a cathode separator that is disposed in a state proximate to the external surface of the cathode in the membrane electrode assembly, and that is at least provided with a groove for forming a channel for feeding an oxidizer-containing cathode reaction gas to the cathode from outside the membrane electrode assembly;
- an anode separator that is disposed in a state proximate to the external surface of the anode in the membrane electrode assembly, and that is at least provided with a groove for forming a channel for feeding a reductant-containing anode reaction gas to the anode from outside the membrane electrode assembly; and
- wherein water fed to the electrolyte from outside the electrolyte is blocked off.

19. The membrane electrode assembly of claim 1, wherein the backbone is an oxide having metal atoms bonded with oxygen atoms.

20. The membrane electrode assembly of claim 1, wherein the metal atoms of the backbone are selected from the group consisting of silicon, aluminum and titanium.

21. The membrane electrode assembly of claim 1, wherein the atoms of the backbone are selected from the group consisting of oxygen, silicon, aluminum and titanium.

22. The membrane electrode assembly of claim 1, wherein the polymer of the solid electrolyte has phosphoric acid functional groups.

23. The membrane electrode assembly of claim 1, wherein the polymer of the solid electrolyte has carboxylic acid functional groups.

24. A solid electrolyte, wherein a plurality of pores with mean pore diameters of 1 to 5 nm are formed; and
- wherein said solid electrolyte is porous and is made from a polymer having an inorganic backbone in which an organic group having one or more carbon atoms is bonded to the metal atoms or oxygen atoms in the inorganic backbone, wherein the inorganic backbone has metal atoms and oxygen atoms bonded to metal atoms and which consists of inorganic elements, and also has functional groups with ion-exchange capabilities that are bonded to the organic groups in the pores; and
- having one or more peaks at a diffraction angle that corresponds to a d-value of 1.5 nm or less in an X-ray diffraction pattern; and
- wherein the pores of the solid electrolyte contain liquid water.

25. The solid electrolyte according to claim 24, wherein the functional groups with ion-exchange capabilities are at least one group selected from the sulfonic acid group, phosphoric acid group, and carboxylic acid group.

26. The solid electrolyte according to claim 24, wherein the functional groups are sulfonic acid groups.

27. The solid electrolyte according to claim 24, wherein the functional groups are phosphoric acid groups.

28. The solid electrolyte according to claim 24, wherein the functional groups are carboxylic acid groups.

* * * * *